United States Patent [19]
Zhang et al.

[11] Patent Number: 5,832,182
[45] Date of Patent: Nov. 3, 1998

[54] METHOD AND SYSTEM FOR DATA CLUSTERING FOR VERY LARGE DATABASES

[75] Inventors: Tian Zhang; Raghu Ramakrishnan; Miron Livny, all of Madison, Wis.

[73] Assignee: Wisconsin Alumni Research Foundation, Madison, Wis.

[21] Appl. No.: 690,876

[22] Filed: Apr. 24, 1996

[51] Int. Cl.$^6$ .................................................. G06F 15/18
[52] U.S. Cl. .............................. 395/10; 707/101; 382/226
[58] Field of Search .......................... 395/10, 11, 800.17, 395/703, 800; 382/226, 145; 364/581, 555; 707/101; 348/606; 345/440

[56] References Cited

U.S. PATENT DOCUMENTS

| | | | |
|---|---|---|---|
| 5,040,133 | 8/1991 | Feintuch et al. | 364/581 |
| 5,179,643 | 1/1993 | Homma et al. | 345/440 |
| 5,263,120 | 11/1993 | Bickel | 395/11 |
| 5,325,466 | 6/1994 | Kormacker | 395/77 |
| 5,329,596 | 7/1994 | Sakou et al. | 382/226 |
| 5,375,175 | 12/1994 | Kino et al. | 382/8 |
| 5,404,561 | 4/1995 | Castelaz | 395/800.17 |
| 5,423,038 | 6/1995 | Davis | 395/683 |
| 5,424,783 | 6/1995 | Wong | 348/606 |
| 5,440,742 | 8/1995 | Schwanke | 395/703 |
| 5,448,727 | 9/1995 | Annevelink | 707/101 |
| 5,555,196 | 9/1996 | Asano | 364/555 |

OTHER PUBLICATIONS

P. Cheeseman, et al., "AutoClass: A Bayesian Classification System," Proc. of the 5th Int'l. Conf. on Machine Learning, Morgan Kaufman, Jun. 1988, pp. 296–306.

R. Dubes, et al., "Clustering Methodologies in Exploratory Data Analysis," Advances in Computers, vol. 19, Academic Press, New York, 1980, pp. 113–228.

M. Ester, et al., "A Database Interface for Clustering in Large Spatial Databases," Proc. of 1st Int'l. Conf. on Knowledge Discovery and Data Mining, 1995.

M. Ester, et al., "Knowledge Discovery in Large Spatial Databases: Focusing Techniques for Efficient Class Identification," Proc. of 4th Int'l. Symposium on Large Spatial Databases, Portland, Maine, 1995, pp. 1–20.

D. Fisher, "Knowledge Acquisition Via Incremental Conceptual Clustering," Machine Learning, vol. 2, No. 2, 1987, pp. 139–172 (original publication).

D. Fisher, "Iterative Optimization and Simplification of Hierarchical Clusterings," Technical Report CS–95–01, 1995, Dept. of Computer Science, Vanderbilt University, Nashville, Tenn., pp. 1–33.

M. Lebowitz, "Experiments with Incremental Concept Formation: UNIMEM," Machine Learning, vol. 2, 1987, pp. 103–138.

R.C.T. Lee, "Clustering Analysis and Its Applications," Adv. In Info. Sys. Sci., vol. 8, 1987, pp. 169–292.

(List continued on next page.)

*Primary Examiner*—Allen R. MacDonald
*Assistant Examiner*—Sanjiv Shah
*Attorney, Agent, or Firm*—Foley & Lardner

[57] ABSTRACT

Multi-dimensional data contained in very large databases is efficiently and accurately clustered to determine patterns therein and extract useful information from such patterns. Conventional computer processors may be used which have limited memory capacity and conventional operating speed, allowing massive data sets to be processed in a reasonable time and with reasonable computer resources. The clustering process is organized using a clustering feature tree structure wherein each clustering feature comprises the number of data points in the cluster, the linear sum of the data points in the cluster, and the square sum of the data points in the cluster. A dense region of data points is treated collectively as a single cluster, and points in sparsely occupied regions can be treated as outliers and removed from the clustering feature tree. The clustering can be carried out continuously with new data points being received and processed, and with the clustering feature tree being restructured as necessary to accommodate the information from the newly received data points.

34 Claims, 23 Drawing Sheets

OTHER PUBLICATIONS

F. Murtagh, "A Survey of Recent Advances in Hierarchical Clustering Algorithms," The Computer Journal, 1983, pp. 354–359.

R. Ng, et al., "Efficient and Effective Clustering Methods for Spatial Data Mining," Proc. of 20th VLDB Conf., 1994, pp. 144–155.

C. Olson, "Parallel Algorithms for Hierarchical Clustering," Technical Report, Computer Science Division, University of California at Berkeley, Dec. 1993, pp. 1–24.

El Sherif et al., Pattern recognition using neural networks that learn from fuzzy rules Proceedings of the 37th Midwest symposium on circuits and systems, pp. 599–602, Aug. 5, 1994.

Cheng, Fuzzy clustering as blurring, Proceedings of the third IEEE conference on fuzzy systems, pp. 1830–1834, Jun. 29, 1994.

Matthews et al., Clustering without a metric, IEEE transactions on pattern analysis and Machine intelligence, pp. 175–184, Feb. 1991.

Kosaka et al., Tree–structured speaker clustering for fast speaker adaptation, ICASSP–94, pp. I/245–I/248, Apr. 22, 1994.

Frigui et al., Competitive fuzzy clustering, NAFIPS, pp. 225–228, Jun. 22, 1996.

Perrone, A novel recursive partitioning criterion, IJCNN–91, p. 989, Jul. 14, 1991.

METHOD AND SYSTEM FOR DATA CLUSTERING FOR VERY LARGE DATABASES

This invention was made with United States Government support awarded by NASA, Grant No. NAGW 3921 and NSF, Grant No. IRI-9057562. The United States Government has certain rights in this invention.

FIELD OF THE INVENTION

This invention pertains generally to the field of information processing systems and methods and particularly to the clustering of data from large databases to determine useful patterns therein.

BACKGROUND OF THE INVENTION

There is a growing emphasis on exploratory analysis of large datasets to discover useful patterns. Organizations are investing heavily in "data warehousing" to collect data in a form suitable for extensive analysis, and there has been extensive research on exploratory analysis of "data mining" algorithms.

For a data mining method to be successful in a database environment, it must scale well in terms of time and space requirements as the dataset size increases While scalability is the essential requirement for dealing with very large datasets, several other characteristics are highly desirable: (1) Generality: the method should be applicable to a variety of domains; (2) Summarization: the method should extract patterns and represent them in more compressed uniform formats, so that traditional database facilities can be used to manage and query the data at this higher level of abstraction; (3) Interactiveness: the method should be able to accept feedback from users to interactively fine-tune the search for patterns; and (4) Incrementality: The method should be capable of working with data that is input incrementally, not necessarily all at once.

Given a very large set of multi-dimensional data points, the data space is usually not uniformly occupied by the data points. Instead, some places in the space are sparse while others are crowded. Data clustering identifies the sparse and the crowded places, and hence discovers the overall distribution patterns of the dataset. Therefore, by using clustering techniques, a better understanding can be obtained of the distribution patterns of the dataset and the relationship patterns among data attributes to improve data organizing and retrieving. It is also possible to visualize the derived clusters much more efficiently and effectively than the original dataset. Indeed, when the dataset is very large and the dimensions are higher than two, visualizing the whole dataset in full dimensions is almost impossible.

Generally, there are two types of attributes involved in data to be clustered: metric and nonmetric. Informally, a metric attribute is an attribute whose values satisfy the requirements of Euclidian space, i.e., self identity (for any value X, X=X) and triangular inequality (there exists a distance definition such that for any values X1, X2, X3, distance (X1, X2) + distance (X2, X3) $\geq$ distance (X1, X3). A nonmetric attribute does not satisfy these requirements. Thus, the two types of attributes are intrinsically different with respect to computational characteristics.

Data clustering has been studied in the statistics, machine learning, and database communities with different methods and different emphasis.

Most data clustering algorithms in the machine learning literature use probability-based approaches; that is, a probability-based measurement function is used to evaluate clustering decisions, and each cluster is represented as a probability distribution. Several aspects of these approaches need justification before they can be used for data clustering in very large databases. They typically try to handle metric and nonmetric attributes at the same time and in the same way. For example, the approach in the paper by McKusick and Thompson, "COBWEB/3: A Portable Implementation," NASA Ames Research Center, Artificial Intelligence Research Branch, TR FIA-90-6-18-2, June, 1990, handles both "nominal" attribute (e.g., color = red, blue, or yellow) and "numeric" attribute (e.g., diameter =0..10) similarly. It is not clear whether this is appropriate. Such approaches also typically compute the probability for a combination of attribute values by simply multiplying the probabilities of each individual attribute value. This is under the assumption that probability distributions on separate attributes are statistically independent of each other. In reality, this assumption is far from true. The correlation between attributes prevails, and sometimes this kind of correlation is exactly sought.

The probability distribution representations of clusters make updating and storing the clusters very expensive to support, especially if the attributes have a large number of values, because their time and space complexities are not only relevant to the number of attributes, but also relevant to the number of values for each attribute.

Often the tree that is built to identify clusters is not height-balanced and the tree size is not bounded. See Douglas H. Fisher, "Knowledge Acquisition via Incremental Conceptual Clustering," Machine Learning, Vol. 2, No. 2, 1987. This may cause the time and space complexities to degrade dramatically with skewed data input.

Clustering analysis in the statistics literature uses distance-based approaches. That is, a distance-based measurement function is used to evaluate clustering decisions, and each cluster is represented either by all the data points in the cluster or by a representative center if one exists. Only metric attributes are considered, and the notion of distance is based on a natural notion of resemblance such as Euclidian distance or Manhattan distance.

The problem is formalized as follows. Given the desired number of clusters K, a dataset of N points, and a distance-based measurement function (e.g., the average distance between pairs of points in a cluster), a partition of the dataset is sought that minimizes the value of the measurement function. This is a nonconvex discrete optimization problem. Due to an abundance of local minima, there is typically no way to find a global minimal solution without trying all possible partitions. The following methods have been proposed for finding the global minimum, a local minimum or just a good solution:

1. Exhaustive Enumeration (EE): There are approximately $K^N/K!$ ways of partitioning a set of N data points into K subsets. So, in practice, though this approach can find the global minimum, it is infeasible except when N and K are extremely small.

2. Iterative Optimization (IO): This approach starts with an initial partition, then tries all possible moving or swapping of data points from one group to another to see if such a moving or swapping improves the value of the measurement function. Like beam searching with beam size $=\infty$ or deepest gradient hill climbing, it cannot guarantee finding the global minimum, but it can find a local minimum. However, the quality of the local minimum it finds is very sensitive to the initially selected partition, and the worst case complexity is still exponential.

3. Hierarchical Clustering (HC): Hierarchical Clustering is divided into two distinct classes: agglomerative and divisive. Agglomerative clustering (bottom-up clumping) starts with a partition of N clusters, each containing exactly one data point. Then, it repeatedly merges the closest pair of clusters until there are exactly K clusters. Divisive clustering (top down splitting) starts with all data points in one cluster. Then, it repeatedly chooses a cluster to split into two until it obtains exactly K clusters. Either way, the clustering procedure can be formalized as a binary tree being build up bottom-up or top-down. It is generally agreed that the computation needed for agglomerative clustering is comparable with that for divisive clustering. Examining the complexity of agglomerative clustering, it is found that: (1) this clustering tree is not height-balanced; (2) each merging step needs $O(N_i^2)$ pairwise comparisons where $N_i$ is the number of currently formed clusters; (3) there are totally N-K merging steps. HC can not guarantee finding the global minimum or a local minimum, but generally, it can find a good partition. This good partition might be even better than some local minima. There has been much work on improving the $O(N_i^2)$ pairwise comparisons in each merging step. With some reasonable distance measurements, the best time and space complexity of a practical HC algorithm is $O(N^2)$. Thus, the approach does not scale well as data size increases.

Clustering has been recognized as a very useful data mining method in recent years. Ng and Han have presented a clustering algorithm, referred to as CLARANS, that is based on randomized search. See Raymond T. Ng and Jiawei Han, "Efficient and Effective Clustering Methods for Spatial Data Mining," Proc. of 20th VLDB Conf., 1994, pp. 144–155. A cluster is represented by its medoid, which is the most centrally located data point within the cluster. The clustering process is formalized in terms of searching a graph in which each node is a potential solution. Specifically, a node is a K-partition represented by a set of K medoids, and two nodes are neighbors if they only differ by one medoid. CLARANS starts with a randomly selected node. For the current node, it checks at most the specified "maxneighbor" number of neighbors randomly, and if a better neighbor is found, it moves to the neighbor and continues; otherwise it records the current node as a "local minimum." CLARANS stops after the specified "numlocal" number of the so-called "local minima" have been found, and returns the best of these.

CLARANS is thus an IO method, with the following specific choices: (1) cluster representatives are medoids; (2) instead of beam size $=\infty$ and checking all neighbors, it sets beam size = maxneighbor and checks at most maxneighbor neighbors randomly; and (3) it runs the beam searching numlocal times with different initial partitions to try to reduce the sensitivity to the initial selection.

The solutions that CLARANS finds are not guaranteed to be either global minimal or local minimal because it does not search all possible neighbors. Unless maxneighbor or numlocal are set to be sufficiently large, there is no assurance of even finding good partitions. Theoretically, the graph size is about $N^K/K!$, and the number of neighbors for each node is K(N-K), so as N and K increase, these values grow dramatically. In Ng and Han, supra, based on experimentation, numlocal is set to 2 and maxneighbor is set to be the larger of 1.25%K(N-K) or 250. With numlocal =2 and maxneighbor =1.25% K(N-K), which part of the graph is searched and how much of the graph is examined depends heavily upon the data distribution and the choice of starting points for each iteration.

For every neighbor it checks, CLARANS has to scan the whole dataset to calculate the increase or decrease of the measurement value to decide if the neighbor is better or worse. This is a drawback for use in very large databases, as can be illustrated by an example: Assume N=1000 and K=10. Then the graph has about $1000^{10}/10! = 2.76 \times 10^{24}$ nodes. Each node in the graph has 10 * (1000−10)=9900 neighbors. Assume that CLARANS only searches a small portion of the graph, say 100 nodes, and halts. Assume that for each node it searches, on average, only a small portion of the neighbors, say 25, are checked. Then, the entire dataset must be scanned 25 times for a single node; 2500 scans of the dataset are needed for the 100 nodes searched.

It is thus expected that CLARANS will not scale well as K and N increase, and that the results will be sensitive to the data distribution which makes the method essentially inapplicable when the dataset is so large that it does not fit in available main memory.

Another potential limitation of CLARANS is its use of medoids to represent clusters. The advantage of using medoids as cluster representatives is that the search space is reduced from about $K^N/K!$ to about $N^K/K!$, because there are $C_N^K$ ways of selecting a set of K medoids from N data points. However, medoids are not always good representatives. For example, suppose that data points are uniformly distributed along the circumference of a circle. Then, every data point in the cluster satisfies the medoid definition, but none represents the cluster as well as the centroid. Thus, when the data distribution in a cluster is such that none of the points is really central, medoids tend to distort the clustering.

SUMMARY OF THE INVENTION

In accordance with the present invention, multidimensional data contained in very large databases can be efficiently and accurately clustered to determine patterns therein and extract useful information from such patterns. The processing system and method of the present invention may be used to filter visual images from signal information obtained from satellites, medical scanning machines, and the like, to provide desired portions of the image signal data to a user. The processing system and method of the present invention are well suited to function with conventional computer processors having limited memory capacity and conventional operating speed, allowing massive data sets to be processed in a reasonable time and with reasonable computer resources.

The present invention is statistical and distance-based and is well suited to working with metric data. The clustering problem is particularly formulated in a way that is appropriate for very large datasets: The goal is to cluster a given (typically very large) dataset using a given amount of memory as accurately as possible while keeping the input/output costs low. The invention recognizes that the available memory may well be much smaller than the size of the dataset.

In addition, the present invention has several advantages over previous distance-based approaches. The invention utilizes a local (as opposed to a global) method in that each clustering decision is made without scanning all data points or all currently existing clusters. It uses measurements that can reflect the natural "closeness" of points and, at the same time, can be efficiently and incrementally calculated and maintained during the clustering process.

The present invention exploits the important observation that the data space is usually not uniformly occupied, and hence not every data point is equally important for clustering purposes. It differentiates the crowded and sparse regions in the data space. In accordance with the invention, a dense region of points is treated collectively as a single "cluster" at some level of granularity. Thus, the problem of clustering the original dataset is reduced into that of clustering a much smaller derived subcluster set. Points in sparsely occupied regions can be treated as "outliers" and removed, preferably at the option and under the control of the user. Because of these features, the invention performs especially well on skewed data, and is quite insensitive to the order in which the data points are received.

The invention makes full use of available computer memory to derive the finest possible subclusters (to maximize accuracy) while minimizing input/output costs (to maximize efficiency). The clustering and reducing process is organized and characterized by the use of an inmemory, condensed, height-balanced and highly occupied clustering feature tree structure. The clustering features corresponding to each cluster form the leaves of the tree. The clustering feature for each cluster comprises the number of data points in the cluster, the linear sum of the data points in the cluster, and the square sum of the data points in the cluster. In the present invention, if the amount of available memory in the computer system is M bytes, the space complexity is on the order of M, i.e., O(M), and the time complexity is $0(dNBlog_B(M/P))$, where d is the data dimensionality, N is the number of data points in the dataset, and B is the tree branching factor determined by the page size P.

The invention may be carried out with an incremental method that does not require the whole dataset in advance, and with only one scan of the dataset being required. The number of clusters, K, can be either specified by the user or a natural value determined from the dataset. This flexibility is important because: (1) for a very large multi-dimensional dataset, it is usually not easy to predict the correct K before doing the clustering, and (2) if a poor K is chosen, even with the exhaustive calculation of the optimal partition of data into K groups, the results will not satisfactorily reflect the reality.

Furthermore, the invention allows users to tune the performance according to their knowledge of the dataset by controlling several parameters.

Further objects, features and advantages of the invention will be apparent from the following detailed description when taken in conjunction with the accompanying drawings.

DETAILED DESCRIPTION OF THE INVENTION

Figure 1:
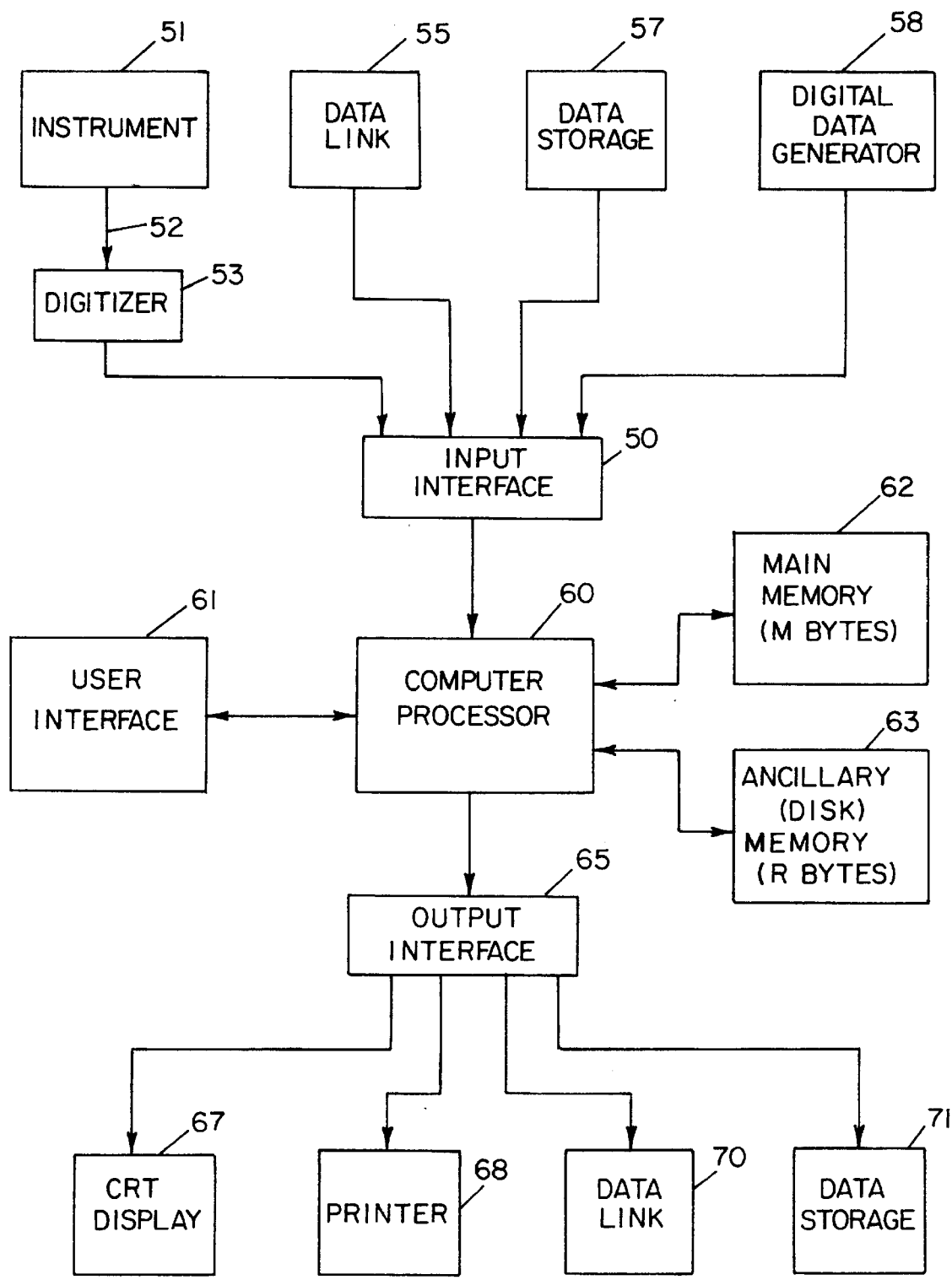
FIG. 1 is a diagram of a processing system for carrying out data clustering in accordance with the present invention.

The present invention may be utilized to extract useful information from various instruments and systems which act as a data source. The processing system of the present invention is shown for illustrative purposes in FIG. 1 receiving data to an input interface 50 from a variety of data sources. Typical data sources include an instrument 51 that provides an analog output signal on a line 52 which is converted to digital data in an analog-to-digital converter 53 before being provided to the input interface 50, a data transmission link 55 that provides digital data directly to the interface 50, recorded data storage equipment 57, such as readers for magnetic disks, CD-ROMs, magnetic tape, etc., and a digital data generator 58, which functions to provide signal data in digital form that can be provided directly to the input interface 50.

The instrument 51 can comprise any of various types of instrument systems which provide signals indicative of some physical characteristic, such as television cameras, X-ray tomography systems, magnetic resonance imaging (MRI) systems, infrared scanners, X-ray scanners, visible light microscopes, electron microscopes, and the like. In certain cases, signal data may be obtained from more than one instrument examining the same space. For example, a particular scene may be scanned by both a camera sensitive to visible light and an infrared camera, so that spatially correlated data obtained by examining different spectral characteristics of the same scene at the same time is provided by the instrument(s) 51 through the digitizer 53 to the input interface 50. Moreover, information obtained in substantially "real time" by the instrument 51 may be correlatable with the data received from the recorded data storage equipment 57, the digital data generator 58, or the data transmission link 55. All of such data, which may have spatial or time correlation, is provided to a processor 60, a computer system capable of appropriate processing, such as image processing. An example of a computer system which may be utilized for image processing is an HP 9000/720 workstation running under the HP-UNIX operating system.

Associated with the processor 60 is a user interface 61 of conventional design, a main random access memory (RAM) 62 having a memory capacity of "M" bytes, an ancillary memory 63, which may be a hard disk, floppy disk, etc., which has a limited capacity of "R" bytes, and an output interface 65. The output interface 65 can provide signal data from the processor 60 to a variety of output devices, such as a CRT display 67 or a hard copy printer 68. Further, the data from the output interface 65 can be provided through a data transmission link 70 to remote equipment for further processing, analysis, or display. In addition, the data from the output interface 65 can be provided to a data storage system 71, such as magnetic tape or disks.

As described further below, the present invention can be utilized to obtain meaningful restructuring of signal data to enhance desired information, find correlation between variables, and extract patterns from data even in the presence of substantial noise. A particular example of the implementation of the present invention is in image filtering wherein two-dimensional signal data is provided from an instrument, such as a video camera, or similar device, which contains several signal patterns but in which only data corresponding to some of the patterns is desired.

For purposes of explaining the invention, some basic definitions from statistics are presented below. Some data transformations that can be optionally applied are also discussed. Standard terminology of vector spaces and vector operations, such as vector addition, vector subtraction, and vector dot product, are used. For a further explanation of such terminology, see, Richard Duda and Peter E. Hart, *Pattern Classification and Scene Analysis,* Wiley, 1973.

First, centroid, radius and diameter for a cluster are defined.

Definition 1: Given N d-dimensional data points in a cluster: $\{\vec{X}_i\}$, where i=1,2, ..., N, the centroid $\vec{X}O$ of the cluster is defined as:

$$\vec{X}O = \frac{\sum_{i=1}^{N} \vec{X}_i}{N}. \tag{1}$$

Definition 2: Given N d-dimensional data points in a cluster: $\{\vec{X}_i\}$, where i=1,2, ..., N, the radius, R, of the cluster with respect to the centroid $\vec{X}O$ is defined as:

$$R = \left( \frac{\sum_{i=1}^{N} (\vec{X}_i - \vec{X}O)^2}{N} \right)^{1/2}. \tag{2}$$

Definition 3: Given N d-dimensional data points in a cluster: $\{\vec{X}_i\}$, where i=1,2, ..., N, the diameter, D, of the cluster is defined as:

$$D = \left( \frac{\sum_{i=1}^{N} \sum_{j=1}^{N} (\vec{X}_i - \vec{X}_j)^2}{N(N-1)} \right)^{1/2}. \tag{3}$$

The radius is the average value of distances from member points to the centroid. The diameter is the average value of pairwise distances within the cluster. They are two alternative measures of the tightness of the cluster around the centroid.

Next, between two clusters, five alternative distances for measuring the closeness of clusters are defined:

Definition 4: Given the centroids of two clusters: $\vec{X}O_1$ and $\vec{X}O_2$, the centroid Euclidian distance, D0, of the two clusters is defined as:

$$DO = ((\vec{X}O_1 - \vec{X}O_2)^2)^{1/2}. \tag{4}$$

Definition 5: Given the centroids of two clusters: $\vec{X}O_1$ and $\vec{X}O_2$, the centroid Manhattan distance, D1, of the two clusters is defined as:

$$D1 = |\vec{X}O_1 - \vec{X}O_2| = \sum_{i=1}^{4} |XO_1^{(i)} - XO_2^{(i)}|. \tag{5}$$

where $|XO_1^{(i)} - XO_2^{(i)}|$ is the absolute difference of $\vec{X}O_1$ and $\vec{X}O_2$ in the i-th dimension.

Definition 6: Given $N_1$ d-dimensional data points in a cluster: $\{\vec{X}_i\}$ where i=1,2, ..., $N_1$, and $N_2$ data points in another cluster: $\{\vec{X}_j\}$ where j=$N_1$+1, $N_1$+2, ..., $N_1+N_2$, the average inter-cluster distance, D2, of the two clusters is defined as:

$$D2 = \left( \frac{\sum_{i=1}^{N_1} \sum_{j=N_1+1}^{N_1+N_2} (\vec{X}_i - \vec{X}_j)^2}{N_1 N_2} \right)^{1/2}. \tag{6}$$

Definition 7: Given $N_1$ d-dimensional data points in a cluster: $\{\vec{X}_j\}$ where j=$N_1$+1, $N_1$+2, ..., $N_1+N_2$, the average inter-cluster distance of the cluster formed by merging the given two clusters, D3, is defined as:

$$D3 = \left( \frac{\sum_{i=1}^{N_1+N_2} \sum_{j=1}^{N_1+N_2} (\vec{X}_i - \vec{X}_j)^2}{(N_1+N_2)(N_1+N_2-1)} \right)^{1/2}. \tag{7}$$

Definition 8: Given $N_1$ d-dimensional data points in a cluster: $\{\vec{X}_i\}$, where i=1,2, ..., $N_1$, and $N_2$ data points in another cluster: $\{\vec{X}_j\}$ where j=$N_1$+1, $N_1$+2, ..., $N_1+N_2$, The variance increase distance of the cluster formed by merging the given two clusters, D4, is defined as:

$$D4 = \sum_{k=1}^{N_1+N_2} \left[ \vec{X}_k - \frac{\sum_{ik=1}^{N_1+N_2} \vec{X}_{ik}}{N_1+N_2} \right]^2 - \quad (8)$$

$$\sum_{i=1}^{N_1} \left[ \vec{X}_i - \frac{\sum_{ii=1}^{N_1} \vec{X}_{ii}}{N_1} \right]^2 -$$

$$\sum_{j=N_1+1}^{N_1+N_2} \left[ \vec{X}_j - \frac{\sum_{ij=N_1+1}^{N_1+N_2} \vec{X}_{ij}}{N_2} \right]^2.$$

The average intra-cluster distance D3 between two clusters is actually the diameter D of the merged cluster. For clarity of concept and algorithm descriptions, $\vec{X}O$, R and D are used only as properties of a single cluster, and D0, D1, D2, D3, and D4 are used as properties between clusters.

In carrying out the present invention, it is possible to preprocess data by weighting or shifting the data along different dimensions without affecting the relative placement. For example, to normalize the data, one can shift the data by the mean value along each dimension, and then weight the data by the inverse of the standard deviation in each dimension. In general, such data preprocessing may not be necessary. Preprocessing may be used to avoid biases caused by some dimensions. For example, the dimensions with large spread dominate the distance calculations in the clustering process. On the other hand, it may be inappropriate to use such preprocessing if the spread is indeed due to natural differences of clusters. Preferably, a user who knows the meaning of the data can decide whether normalization is appropriate. Thus, it is preferred to leave the data transformation option to the user. The following two (optional) operations are preferably available in accordance with the present invention.

Definition 9: A weighting operation $\vec{W}$ for a d-dimensional vector space is represented as a d-dimensional vector of positive weight values: $\vec{W}=[w^{(1)}, w^{(2)}, \ldots, w^{(d)}]$, where $w^{(j)}>0$, $j=1, \ldots, d$, is the weight value for the j-th dimension. The weighting operator $\vec{W}$ is applied to a d-dimensional data point $\vec{X}=[X^{(1)}, X^{(2)}, \ldots, X^{(d)}]$ in the following way:

$$\vec{W}\vec{X} = [w^{(1)}X^{(1)}, w^{(2)}X^{(2)}, \ldots, w^{(d)}X^{(d)}]. \quad (9)$$

Definition 10: A moving operator $\vec{M}$ for a d-dimensional vector space is represented as a d-dimensional vector of positive or negative moving values: $\vec{M}=[m^{(1)}, m^{(2)}, \ldots, m^{(d)}]$ where $m^{(j)}$, $j=1, \ldots, d$, is the moving value for the j-th dimension. The moving operation $\vec{W}$ is applied to a d-dimensional data point $\vec{X}=[X^{(1)}, X^{(2)}, \ldots, X^{(d)}]$, in the following way:

$$\vec{M}\vec{X} = [X^{(1)}-m^{(1)}, X^{(2)}-m^{(2)}, \ldots, X^{(d)}-m^{(d)}]. \quad (10)$$

$\vec{W}$, $\vec{M}$ and any combinations of them are reversible linear transformations and the following equations are easy to prove:

$$\vec{W}^{-1} = \left[ \frac{1}{w^{(1)}}, \frac{1}{w^{(2)}}, \ldots, \frac{1}{w^{(d)}} \right] \quad (11)$$

$$\vec{M}^{-1} = [-m^{(1)}, -m^{(2)}, \ldots, -m^{(d)}] \quad (12)$$

In the material that follows, the concepts of a Clustering Feature and a CF Tree are introduced. These are at the core of incremental computation and maintenance of clustering information in the present invention.

A Clustering Feature is a triple that summarizes the information that is maintained about a cluster. All the properties of clusters defined above can be computed from it.

Definition 11. Given N d-dimensional data points in a cluster: $\{\vec{X}_i\}$ where $i=1,2, \ldots, N$, the Clustering Feature (CF) vector of the cluster is defined as a triple:

$$CF = (N, \vec{LS}, SS) \quad (13)$$

where N is the number of data points in the cluster, $\vec{LS}$ is the linear sum of the N data points, i.e., $\sum_{i=1}^{N}\vec{X}_i$, and SS is the square sum of the N data points, i.e., $\sum_{i=1}^{N}\vec{X}_i^2$.

Theorem 1 (CF Additivity Theorem): Assume that $CF_1=(N_1,\vec{LS}_1,SS_1)$, and $CF_2=(N_2,\vec{LS}_2,SS_2)$ are the CF vectors of two disjoint clusters. Then the CF vector of the cluster that is formed by merging the two disjoint clusters is:

$$CF_1+CF_2 = (N_1+N_2, \vec{LS}_1+\vec{LS}_2, SS_1+SS_2) \quad (14)$$

The proof consists of straightforward algebra.

From the CF definition and the CF additivity theorem, it is apparent that the CF vectors of clusters can be stored and calculated incrementally and accurately as clusters are merged. It also can be proven that, given the CF vectors of clusters, the corresponding $\vec{X}O$, R, D, D0, D1, D2, D3, and D4's can all be calculated. The following is a list of formulas which can be used to calculate $\vec{X}O$, R, D, D0, D1, D2, D3, and D4 from the corresponding CF vectors.

$$\text{centroid } \vec{X}O = \frac{\sum_{i=1}^{N} \vec{X}_i}{N}$$

$$= \frac{\vec{LS}}{N}$$

$$\text{radius } R = \left( \frac{\sum_{i=1}^{N} (\vec{X}_i - \vec{X}O)^2}{N} \right)^{1/2}$$

$$= \left( \frac{SS}{N} - \left(\frac{\vec{LS}}{N}\right)^2 \right)^{1/2}$$

$$\text{diameter } D = \left( \frac{\sum_{i=1}^{N}\sum_{j=1}^{N}(\vec{X}_i - \vec{X}_j)^2}{N(N-1)} \right)^{1/2}$$

$$= \left( \frac{2N*SS - 2*\vec{LS}^2}{N(N-1)} \right)^{1/2}$$

$$\text{centroid Euclidian distance } D0 = ((\vec{X}O_1 - \vec{X}O_2)^2)^{1/2}$$

$$= \left( \left( \frac{\vec{LS}_1}{N_1} - \frac{\vec{LS}_2}{N_2} \right)^2 \right)^{1/2}$$

-continued centroid Manhattan distance $D1 = |\vec{XO_1} - \vec{XO_2}|$ $$= \left| \frac{\vec{LS_1}}{N_1} - \frac{\vec{LS_2}}{N_2} \right|$$

average intercluster distance $D2 = \left( \frac{\sum_{i=1}^{N_1} \sum_{j=N_1+1}^{N_1+N_2} (\vec{X_i} - \vec{X_j})^2}{N_1 N_2} \right)^{1/2}$ $$= \left( \frac{N_1 * SS_2 + N_2 * SS_1 - 2 * \vec{LS_1}\vec{LS_2}}{N_1 N_2} \right)^{1/2},$$

average intracluster distance $D3 = \left( \frac{\sum_{i=1}^{N_1+N_2} \sum_{j=1}^{N_1+N_2} (\vec{X_i} - \vec{X_j})^2}{(N_1+N_2)(N_1+N_2-1)} \right)^{1/2}$ $$= \left( \frac{2(N_1+N_2)*(SS_1+SS_2) - 2*(\vec{LS_1}+\vec{LS_2})^2}{(N_1+N_2)(N_1+N_2-1)} \right)^{1/2};$$

and variance increase distance $$D4 = \sum_{k=1}^{N_1+N_2} \left[ \vec{X_k} - \frac{\sum_{ik=1}^{N_1+N_2} \vec{X_{ik}}}{N_1+N_2} \right]^2 -$$

$$\sum_{i=1}^{N_1} \left[ \vec{X_i} - \frac{\sum_{ii=1}^{N_1} \vec{X_{ii}}}{N_1} \right]^2 -$$

$$\sum_{j=N_1+1}^{N_1+N_2} \left[ \vec{X_j} - \frac{\sum_{ij=N_1+1}^{N_1+N_2} \vec{X_{ij}}}{N_2} \right]^2 =$$

$$N_1 * \left( \frac{\vec{LS_1}}{N_1} \right)^2 + N_2 * \left( \frac{\vec{LS_2}}{N_2} \right)^2 - (N_1+N_2)* \left( \frac{\vec{LS_1}+\vec{LS_2}}{N_1+N_2} \right)^2.$$

In the present invention, the "cluster," composed of a set of data points, is represented by the CF vector, and only the CF vector need be stored in the memory of the computer system. This cluster CF vector summary is not only efficient, because it stores much less than all the data points inside the cluster, but also accurate, because it is sufficient for calculating all the measurements of the clusters that are needed for making clustering decisions in accordance with the invention. The fact that CF vectors can be maintained accurately and incrementally is a particular advantage of the present invention.

Figure 2:
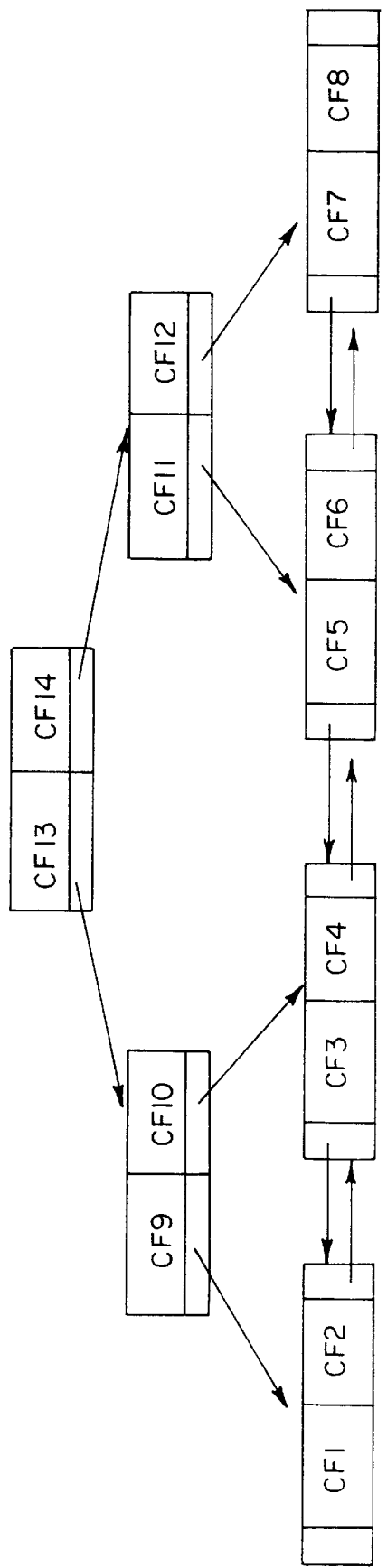
FIG. 2 is an illustrative diagram of clusters organized by a clustering feature (CF) tree.
Figure 3:
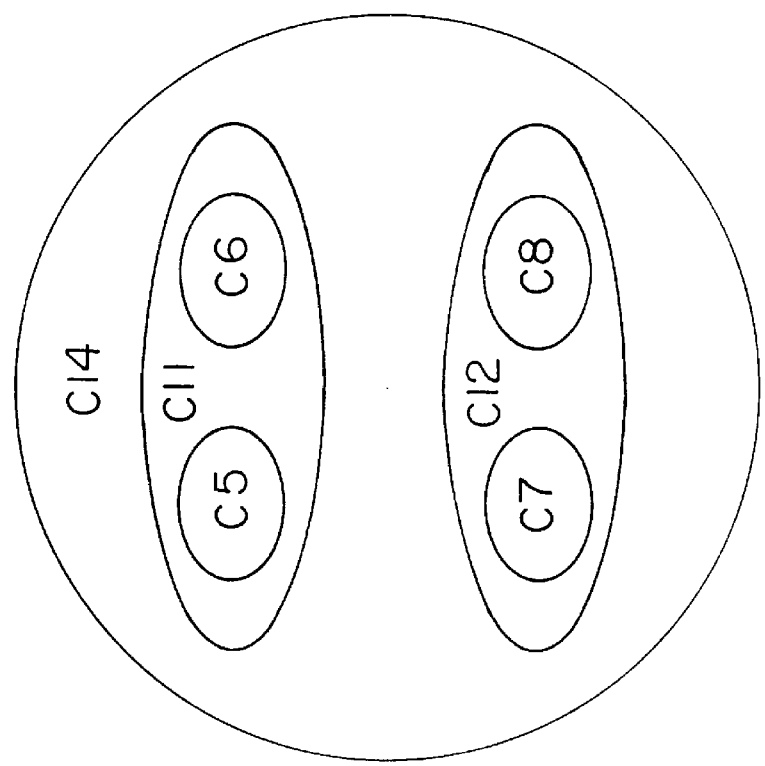
FIG. 3 is an illustrative diagram showing the relationship of the clusters in the CF tree of FIG. 2.
Figure 3:
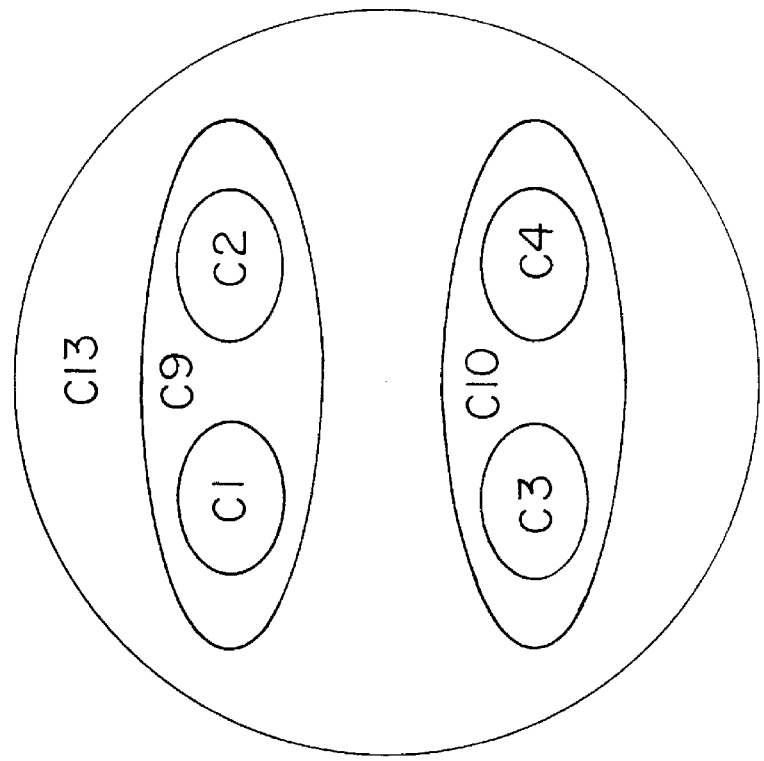

A CF tree is a height-balanced tree with two parameters: a branching factor B and a threshold T. FIG. 2 shows a CF tree of branching factor B=2 and FIG. 3 shows the relationships of the clusters for this tree. Each nonleaf node contains at most B entries of the form [$CF_i$, $child_i$], where i=1, 2, . . . , B, "$child_i$" is a pointer to its i-th child node, and $CF_i$ is the CF vector of the subcluster represented by this child. Thus, a nonleaf node represents a cluster made of all the subclusters represented by its entries. A leaf node contains maximally L entries of the form [$CF_i$], where i=1, 2, . . . , L, and $CF_i$ is the CF vector of the subcluster represented by entry i. In addition, each leaf node has two pointers, "prev" and "next" which are used to chain all leaf nodes together to enable efficient scans. It also represents a cluster made up of the subclusters represented by its entries. But all entries in a leaf node must satisfy a threshold requirement, that is one of the following: radius R is less than T, or diameter D is less than T. (Of course, the requirement is the same with respect to radius or diameter for all leaf nodes in a given tree.) The tree size is a function of the threshold T. The larger T is, the smaller the tree size. In accordance with the present invention, it is preferred that a node fit in a page of memory. Assume the selected page size is P bytes: then B will be P/sizeof(nonleaf entry), and L will be (P-2*sizeof(pointer))/sizeof(leaf entry). Once the dimension of the data space is given, the sizes of leaf and nonleaf entries are known. P is a parameter which can be varied for performance tuning.

Such a CF tree will be built dynamically as new data objects are inserted. It serves several purposes. First, it is used to guide a new insertion into the correct subcluster for clustering purposes, just as a B+-tree is used to guide a new insertion into the correct position for sorting purposes. Second, it is a much more condensed representation of the dataset because each entry in the leaf node is not a single data point but a subcluster whose diameter (or radius) is under a specific threshold T. Third, it is a tool that helps to reduce the problem of clustering the original data points to the problem of clustering the derived T-satisfying subclusters in its leaf nodes.

However, each node can only hold a limited number of entries due to its size, so it does not always correspond to a natural subcluster. Occasionally, two subclusters which should have been in one cluster are split across nodes. Depending upon the order of data entry and the degree of skewness, it is also possible that entries for two subclusters which should not be in one cluster are kept in the same node. These infrequent but undesirable anomalies caused by page size are remedied in Phase 3 of the method in accordance with the invention with a global (or semi-global) algorithm that clusters the leaf entries across nodes. Another undesirable artifact is that if the same data point is inserted twice, but at different times, the two copies might be entered into distinct leaf clusters. This problem can be addressed with an additional pass over the data (Phase 4), as discussed below.

A pseudo-code of the algorithm for inserting an entry into a CF tree is presented below. To understand the algorithm, it is important to note that an entry in a leaf node does not denote a single point, but rather a cluster of data points whose diameter (or radius) is under the given threshold value T. Given an entry "Ent", the system proceeds as follows:

1. Identifying the appropriate leaf: Starting from the root, it recursively descends the CF tree by choosing the closest child node according to the distance metric (D0, D1, D2, D3, or D4, as defined above).

2. Leaf modification: When it reaches a leaf node, it finds the closest leaf entry, say $L_i$, and then tests whether $L_i$ can "absorb" the new entry "Ent" and still satisfy the threshold condition. That is, if we treat "Ent" as a cluster and merge it with the cluster denoted by entry $L_i$, the resulting cluster must satisfy the threshold condition. Note that the CF vector of the new cluster can be computed from the CF vectors for $L_i$ and "Ent". If the threshold condition is satisfied, the CF vector for $L_i$ is updated to reflect this. If not, a new entry for the singleton cluster containing "Ent" is added to the leaf. If there is space on the leaf for this new entry, we are done, otherwise we must split the leaf node. Node splitting is done by choosing the farthest pair of entries as seeds, and redistributing the remaining entries based on the closest criteria.

3. Modifying nodes on the path to the leaf: Each nonleaf entry in the tree is a pointer to a subtree plus a CF vector describing the cluster of points corresponding to that subtree. After inserting "Ent" into a leaf, we must update the CF information for each nonleaf entry on the path to the leaf. In the absence of a split, this simply involves updating CF vectors to reflect the addition of "Ent", and is straightforward. A leaf split requires us to insert a new nonleaf entry into the parent node, to describe the newly created leaf. If the parent has space for this entry, at all higher levels, we only need to update the CF entries to reflect the addition of "Ent". In general, however, we may have to split the parent as well, and so on up to the root. If the root is split, the tree height increases by one.

4. A Merging Refinement: Splits are caused by the page size, which is independent of the clustering properties of the data. In the presence of skewed data input order, this can affect the clustering quality, and also reduce space utilization. A simple additional merging step often helps ameliorate these problems: Suppose that there is a leaf split, and the propagation of this split stops at some nonleaf node $N_j$, i.e., $N_j$ can accommodate the additional entry resulting from the split. We now scan node $N_j$ to find the two closest entries. If they are not the pair corresponding to the split, we try to merge them and the corresponding two child nodes. If there are more entries in the two child nodes than one page can hold, we split the merging result again. During the resplitting, in case one of the seeds attracts enough merged entries to fill a page, the rest of the entries are put with the other seed. In summary, if the merged entries fit on a single page, we free a node space for later use, create one more entry space in node $N_j$, thereby increasing space utilization and postponing future splits; otherwise we improve the distribution of entries in the closest two children.

---

Insert An Entry To CF Tree

```
Status function Insert_Into_CF_Tree
(Node**Root,Node**NewNode,Node *CurNode,Entry Ent,Float T) {
    if (CurNode is Nonleaf Node) {
        Ci = Closest_Child (CurNode,Ent);
        Result = Insert_Into_CF_Tree
        (Root,NewNode,Ci,Ent,T);
        if (Result==NO SPLIT) {
            Update_CF (CurNode,Ci,Ent);
            return NO_SPLIT;
        }
        else {
            Update_CF (CurNode,Ci,Ent);
            NewEnt = Make_Entry_From_Node(*NewNode);
            *NewNode = Insert_To_Nonleaf_Node_Might_
            Split (CurNode,NewEnt);
            if (*NewNode==NULL) {
                Merge_Closest_But_Not_Just_Split_Pair_
                Might_Resplit (CurNode);
                return NO-SPLIT;
            }
            else {
                if (CurNode==*Root) {
                    *Root=Create_New_Root(CurNode,
                    *NewNode);
                    return NO_SPLIT;
                }
                else return SPLIT;
            }
        }
    }
    else {/* CurNode is Leaf Node */
        Li = Closest_Entry (CurNode,Ent);
        If (Absorb (Li,Ent) Satisfies T) {
            Absorb (Li,Ent);
            return NO_SPLIT;
        }
        else {
            *NewNode = Insert_To_Leaf_Node_Might_Split
            (CurNode,Ent);
            if (*NewNode==NULL) return NO_SPLIT;
            else return SPLIT;
        }
    }
}
```

---

Figure 4:
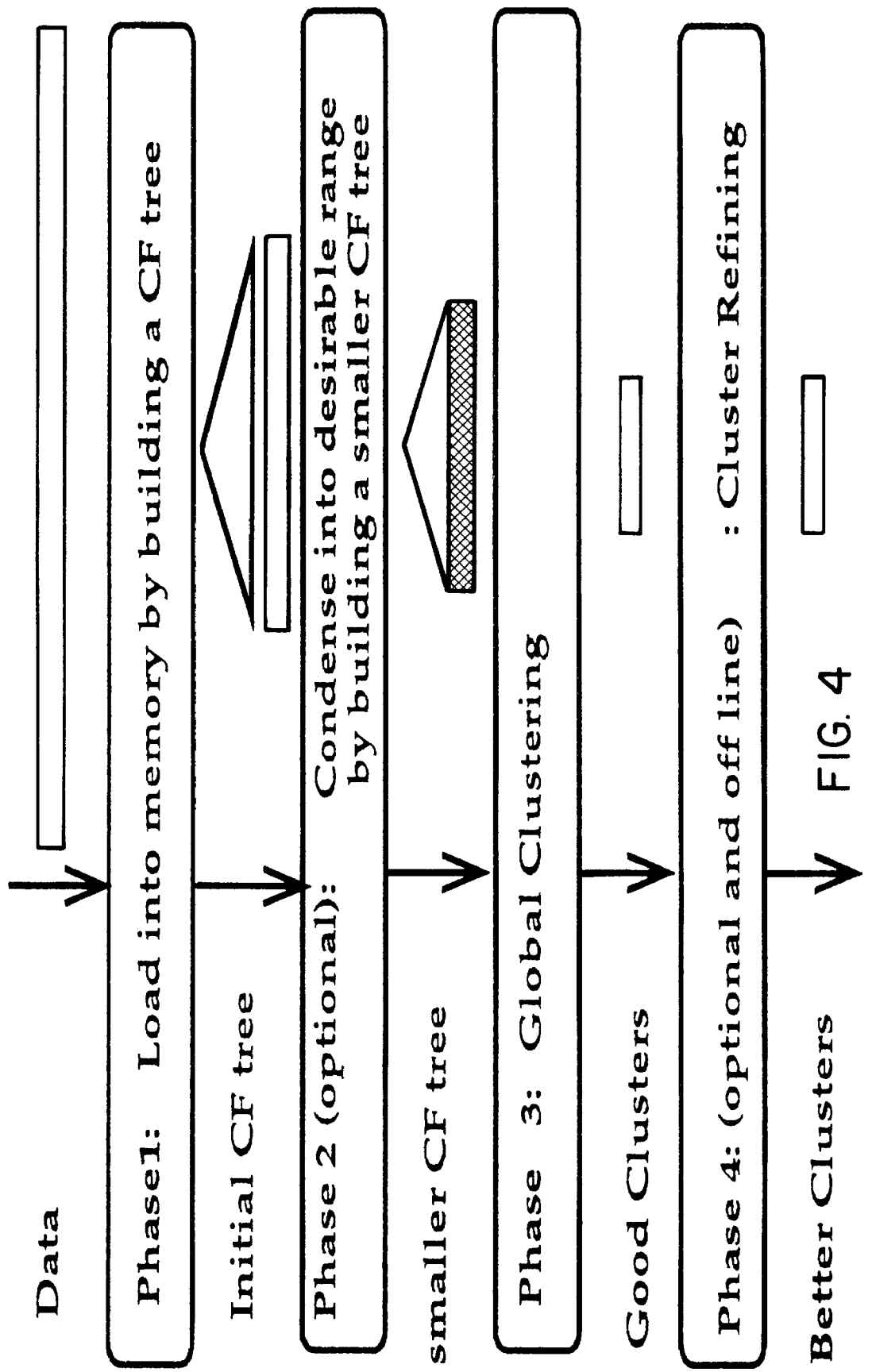
FIG. 4 is a chart showing the arrangement of the phases of operation of the present invention.

FIG. 4 shows the architecture of the present invention including all major phases. The following summarizes the role of each phase and the relationships between the phases. The parameter settings and other implementation details are discussed further below.

The main task of Phase 1 is to scan all data and build up an initial in-memory CF tree using a given amount of memory and recycling space on disk. This CF tree should make the best use of the available memory, and reflect the clustering information of the dataset with the finest possible granularity under the space limit. With crowded data points grouped as fine subclusters, and sparse data points removed as outliers, this phase creates an in-memory summary of the data. Subsequent clustering computations in Phases 2 and 3 will be: (1) fast because (a) no I/O operations are needed, and (b) the problem of clustering the original data is reduced to a smaller problem of clustering the subclusters in the leaf nodes of the initial CF tree; (2) accurate because (a) a lot of outliers are eliminated, and (b) the remaining data is reflected with the finest granularity that can be achieved given the available memory; and (3) less order sensitive because the entries in the leaf nodes of the CF tree form an input order containing much more data locality compared with the arbitrary original data input order.

In addition, since Phase 1 can accept data either from a static file or from a dynamic pipe, Phase 1 can be run in parallel with data generation.

Phase 2 is an optional phase. The global or semi-global clustering methods that we apply in Phase 3 have different input size ranges within which they perform well in terms of both speed and quality. For example, HC performs well for a set of less than 1000 data objects whereas CLARANS performs well for a set of less than 5000 data objects. So, potentially, there is a gap between the size of Phase 1 results and the best performance range of the Phase 3 process. Phase 2 serves as a cushion between Phase 1 and Phase 3 and bridges this gap: we scan the leaf entries in the initial CF tree to build a smaller CF tree, while removing outliers and grouping crowded subclusters into larger ones. Since the entries in the initial CF tree form an input order with good data locality with respect to clusters, the obtained CF tree is quite insensitive to the original data input order.

The clustering processes for a set of data points can be readily adapted to work with a set of subclusters, each described by its CF vector. In Phase 3, the set of leaf entries from the previous phase are re-clustered using an in-memory clustering algorithm. Several points are worth noting:

1. Any of the algorithms available in the literature (e.g., CLARANS, HC, etc.) can be used.
2. Whatever the algorithm, it can be modified to utilize the information in the CF vector and the locality in the CF tree.
3. The good locality of the leaf entries from Phase 2 means that the output of this phase is not much affected by the original input order of the data.

Phase 4 is optional and at the cost of additional passes over the data. It refines the clusters further to correct the minor and localized inaccuracies that might have been caused because Phase 3 clusters at a coarse granularity.

PHASE 1

Figure 5:
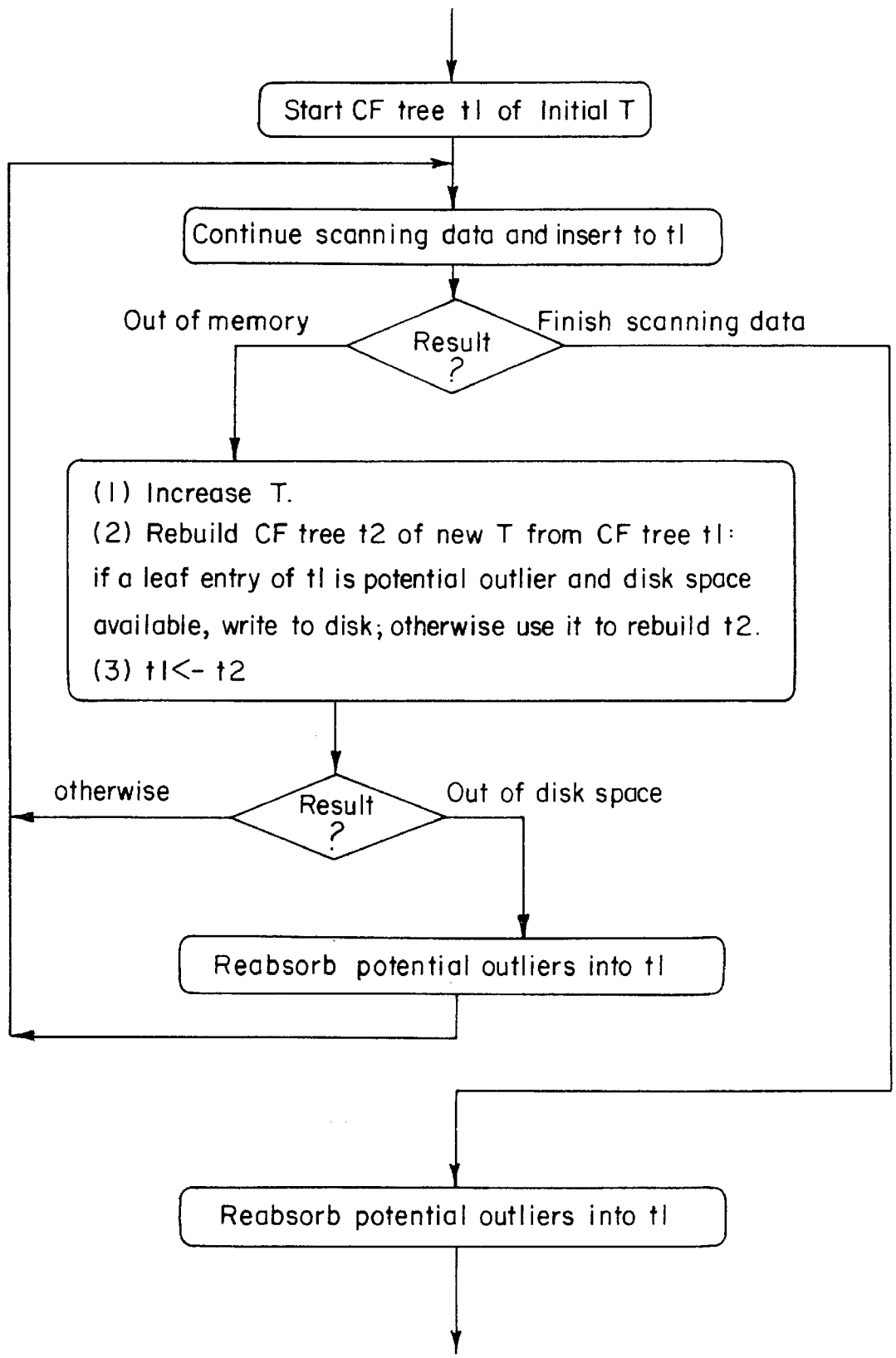
FIG. 5 is a flow chart showing the control flow for phase 1 of the system of the present invention.

FIG. 5 shows the control flow in Phase 1. It is assumed that M bytes of main memory and R bytes of disk space are available. The goal is to cluster the incoming data in the best possible manner while using at most this much (primary and secondary) memory. The input is the original dataset and the output is an in-memory CF tree, which the system of the invention tries to make as fine as possible while fitting in the available main memory. Phase 1 starts with a small initial threshold value, say T, scans the data, and inserts points into the tree. If it runs out of memory before it finishes scanning the data, it then increases the threshold value, and re-builds a new, smaller CF tree with the leaf entries of the old tree. The preferred re-building algorithm, and a resulting reducibility theorem, will now be discussed.

Figure 6:
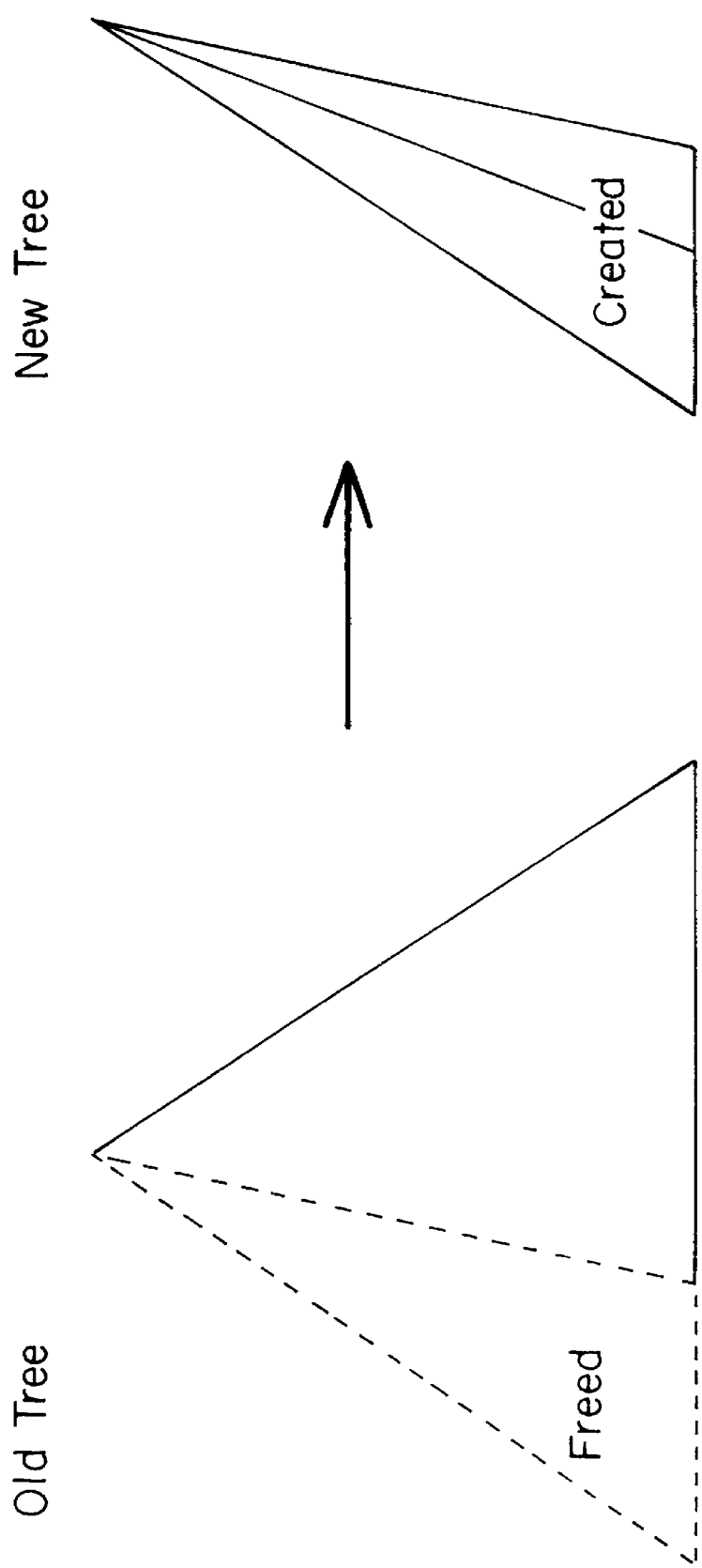
FIG. 6 illustrates the operation of a CF tree rebuilding algorithm as used in phase 1 of the system of the present invention.

Assume $t_i$ is a CF tree of threshold $T_i$. Its height is h, and its size (or number of nodes) is $S_i$. Given $T_{i+1} \geq T_i$, we want to use all the leaf entries in $t_i$ to re-build a CF tree, $t_{i+1}$, of threshold $T_{i+1}$. The size of $t_{i+1}$, $S_{i+1}$, should be smaller than or equal to $S_i$. Assume within each node in CF tree $t_i$, the entries are labeled contiguously from 0 to $n_k-1$, where nk is the number of entries in that node. Then $(i_1, i_2, \ldots, i_{h-1})$ can uniquely represent a path from the $i_1$-th entry in the root node (level 1) to the $i_{h-1}$-th entry in some nonleaf node above the leaf level (level h). In other words, each leaf node corresponds to a path uniquely, and there is an order existing in leaf nodes. Thus, path (or leaf node) $(i_1^{(1)}, i_2^{(1)}, \ldots, i_{h-1}^{(1)})$ is before (or <) path (or leaf node) $(i_1^{(2)}, i_2^{(2)}, \ldots, i_{h-1}^{(2)})$ if $i_1^{(1)}=i_1^{(2)}, \ldots, i_{j-1}^{(1)}=i_{j-1}^{(2)}$, and $i_j^{(1)} < i_j^{(2)} (0 \leq j \leq h-1)$. For simplicity, we will use the terms paths and leaf nodes interchangeably. The CF tree re-building algorithm may now be described with reference to the simple picture of FIG. 6, which illustrates the operation of the algorithm.

The algorithm scans and frees the old CF tree path by path from left to right, and at the same time, creates the new CF tree path by path from left to right. The new tree starts with NULL, and the "Current Path" starts with the leftmost path of the old tree. The nodes (or spaces) are attached to the new tree exactly the same as they are in the old tree, so that there is no extra space growth in the new tree compared with the old tree. Each leaf entry in the "CurrentPath" of the old tree is tested against the new tree to see if it can fit in (i.e., either absorbed by an existing leaf entry, or created as a new leaf entry without splitting) with the new threshold in the "ClosestPath" that is found topdown in the new tree. If yes and the "ClosestPath" is before the "CurrentPath", then it fits in the "ClosestPath" in the new tree without creating any new node, and the space in the "CurrentPath" is left available for later use; otherwise it fits in the "CurrentPath" in the new tree without creating any new node. Once all leaf entries in the "CurrentPath" are processed, we can free the non-needed nodes along the "CurrentPath" in the old tree, and set "CurrentPath" to the next path in the old tree if one still exists. During the re-building, only the nodes corresponding to the "CurrentPath" need to exist simultaneously both on the new tree and on the old tree, so the maximal extra space needed for the tree transformation is h pages. Once the transformation is finished, it is likely that there are empty nodes in the new tree and they should be removed. Based on this algorithm, we can obtain the following theorem easily:

Assume we re-build CF tree $t_{i+1}$ of threshold $t_{i+1}$ from CF tree $t_i$ of threshold $T_i$ by the above algorithm. Let $S_i$ and $S_{i+1}$, be the sizes of $t_i$ and $t_{i+1}$ respectively. If $T_{i+1} \geq T_i$, then $S_{i+1} \leq S_i$, and the transformation from $t_i$ to $t_{i+1}$ needs at most h extra pages of memory where h is the height of $t_i$.

A pseudo-code for the CF tree re-building algorithm follows:

```
void function Re-build_CF_Tree(t_i, t_{i+1}, T_{i+1})  {
t_{i+1} = NULL;
CurrentPath = Path_Of_OldTree (t_i, (0, . . . ,0));
while (CurrentPath exists) {
    Attach_Nodes_To_NewTree_As_CurrentPath_In_OldTree
    (t_{i+1}, t_i, CurrentPath);
    foreach leaf entry CurrentEntry in CurrentPath of
    OldTree do {
        Status = Can_Fit_In_ClosestPath_In_NewTree
        (t_{i+1},T_{i+1}, ClosestPath, CurrentEntry);
        if (Status==YES && ClosestPath<CurrentPath)
            Fit_In_Path_In_NewTree(t_{i+1}, T_{i+1},
            ClosestPath, CurrentEntry);
        else Fit_In_Path_In_NewTree (t_{i+1}, T_{i+1},
            CurrentPath,
            CurrentEntry);
        }
    Free_NonNeeded_Nodes_Along_CurrentPath_In_OldTree
    (t_i, CurrentPath);
    CurrentPath=NextPath_Of_OldTree (t_i, CurrentPath);
    }
t_{i+1} = Free_Empty_Nodes_In_NewTree (t_{i+1});
}
```

The reducibility theorem defined above means that: (1) in general, by increasing the threshold, a smaller tree can be built; and (2) if a CF tree uses up all M/P pages of memory, with $\log_B(M/P)$ reserved pages of memory, the tree can be transformed to a smaller new tree of higher threshold.

As discussed below, some of the leaf entries are not re-inserted into the new CF tree, but are written out to disk. After all the leaf entries of the old tree have been re-inserted (or written out to disk), the scanning of the data (and insertion into the new tree) is resumed from the point at which it was interrupted. In the present invention, preferably no data point in the original dataset is read twice, and an increase in the threshold value and re-building of the CF tree is triggered when the main memory is full. The initial value of the threshold and the rate at which it is increased may be heuristically chosen, and are parameters that can be tuned for performance.

A good choice of threshold value can greatly reduce the number of rebuilds. Since the initial threshold value $T_o$ is increased dynamically, it can be adjusted for its being too low. But if the initial $T_o$ is too high, a less detailed CF tree will be obtained, than is feasible with the available memory. So $T_o$ should be set conservatively. $T_o$ may thus be set to zero by default; although a knowledgeable user could change this.

Suppose that $T_i$ turns out to be too small, and the algorithm subsequently runs out of memory after $N_i$ data points have been scanned, and $C_i$ leaf entries have been formed (each satisfying the threshold condition with respect to $T_i$). Based on the portion of the data that has been scanned and the tree that has been built up so far, an estimate of the next threshold value $T_{i+1}$ is needed. The following heuristic approach may preferably be used to select $T_{i+1}$.

1. Choose $T_{i+1}$ so that $N_{i+1}=\text{Min}(2N_i, N)$. That is, whether N is known, choose to estimate $T_{i+1}$ at most in proportion to the data seen thus far.

2. Intuitively, it is preferable to increase the threshold based on some measure of volume. There are two distinct notions of volume that are used in estimating threshold. The first is average volume, which is defined as $V_a = r^d$ where r is the average radius of the root cluster in the CF tree, and d is the dimensionality of the space. Intuitively, this is a measure of the space occupied by the portion of the data seen thus far (the "footprint" of seen data). A second notion of volume is packed volume, which is defined as $V_P = C_i * T_i^d$, where $C_i$ is the number of leaf entries and $T_i^d$ is the maximal volume of a leaf entry. Intuitively, this is a measure of the actual volume occupied by the leaf clusters. Since $C_i$ is essentially the same whenever the CF tree runs out of memory (since a fixed amount of memory is used), $V_p$ can be approximated by $T_i^d$.

The assumption can be made that r grows with the number of data points $N_i$. By maintaining a record of r and the number of points $N_i$, $r_{i+1}$ can be estimated using least square linear regression. Define the expansion factor $f=\mathrm{Max}(1.0, r_{i+1}r_i/r_i)$, and use it as a heuristic measure of how the data footprint is growing. The use of Max is motivated by the observation that for most large datasets, the observed footprint becomes a constant quite quickly (unless the input order is skewed). Similarly, by making the assumption that $V_p$ grows linearly with $N_i$, $T_{i+1}$ may be estimated using least squares linear regression.

3. Traverse a path from the root to a leaf in the CF tree, always going to the child with the most points in a "greedy" attempt to find the most crowded leaf node. Calculate the distance ($D_{min}$) between the closest two entries on this leaf. To build a more condensed tree, it is reasonable to expect that the threshold value should at least increase to $D_{min}$, so that these two entries can be merged.

4. Multiply the $T_{i+1}$ value obtained through linear regression with the expression factor f, and adjusted it using $D_{min}$ as follows: $T_{i+1}=\mathrm{Max}(D_{min}, f * T_{i+1})$. To ensure that the threshold value grows monotonically, in the very unlikely case that $T_{i+1}$ thus obtained is less than $T_i$ then we choose $$T_{i+1} = T_i * \left(\frac{N_{i+1}}{N_i}\right)^{\frac{1}{d}}.$$

(This is equivalent to assuming that all data points are uniformly distributed in a d-dimensional sphere, and is really just a crude approximation; however, it is rarely called for.)

The available R disk (ancillary) memory is used for dealing with outliers, which are clusters of low density that are judged to be unimportant with respect to the overall clustering pattern in the data. As a special case, no disk memory may be available, i.e., R=0. This is handled by not considering any entry to be an outlier in Phase 1. When the CF tree is rebuilt by re-inserting leaf entries into a new tree, the size of the new tree is reduced in two ways. First, the threshold value is increased, thereby allowing each leaf entry to "absorb" more points. Second, some entries are treated as potential outliers and written out to disk. A leaf entry in the old tree is considered to be a potential outlier if it has "far fewer" data points then the average leaf at present. The number of data points in a leaf entry is known from the CF vector for this entry. The average over all leaf entries in the tree can be calculated by maintaining the total number of data points and the total number of leaf entries in the tree as inserts are made to the tree. What is considered to be "far fewer", may also be chosen heuristically and is a selected value (e.g., a selected ratio of data points in the leaf entry to the average number of data points in each leaf entry).

The potential outlier entries are preferably checked after all the data has been scanned to verify that they are, indeed, outliers — an increase in the threshold value or a change in the distribution due to the new data read after a potential outlier is written to disk could well mean that the potential outlier entry no longer qualifies as an outlier. Ideally, all outliers are processed in one pass after scanning all the input data. However, it is possible to run out of disk space for potential outliers while re-building CF tree $t_2$ from CF tree $t_1$, while there is still some data to be scanned. In this case, disk space is freed by scanning the entries on disk and re-absorbing them into the tree. In this way, the potential outliers written out before the current re-building pass might well be absorbed into the current tree, because the threshold value has increased and/or new data has come in. This periodic attempt to free disk space by re-absorbing potential outliers absorbs all entries that can be absorbed into the current tree without causing the tree to grow in size. In case none of the potential outlier entries is absorbed, they are very likely the real outliers. Thus, further heuristic outlier re-absorbing conditions can be defined dynamically in terms of changes of T and changes of the amount of data scanned to avoid frequent re-absorbs of the data.

It may be noted that the entire cycle — insufficient main memory triggering a re-building of the tree, insufficient disk space and dynamic heuristics triggering a re-absorbing of outliers, etc. — could be repeated several times before the dataset is fully scanned. This effort must be considered in addition to the cost of scanning the data in order to assess the cost of Phase 1 accurately.

It may also be noted that, when the algorithm runs out of main memory, it may well be the case that still more data points can fit in the current CF tree, without changing the threshold. However, some of the data points that are read may require the splitting of a node in the CF tree. A simple variation of the present invention is to write such data points to disk (in a manner similar to how outliers are written), and to proceed reading the data until disk space runs out as well. The advantage of this approach is that, in general, more data points can fit in the tree before a rebuild is required.

PHASE 2

Figure 7:
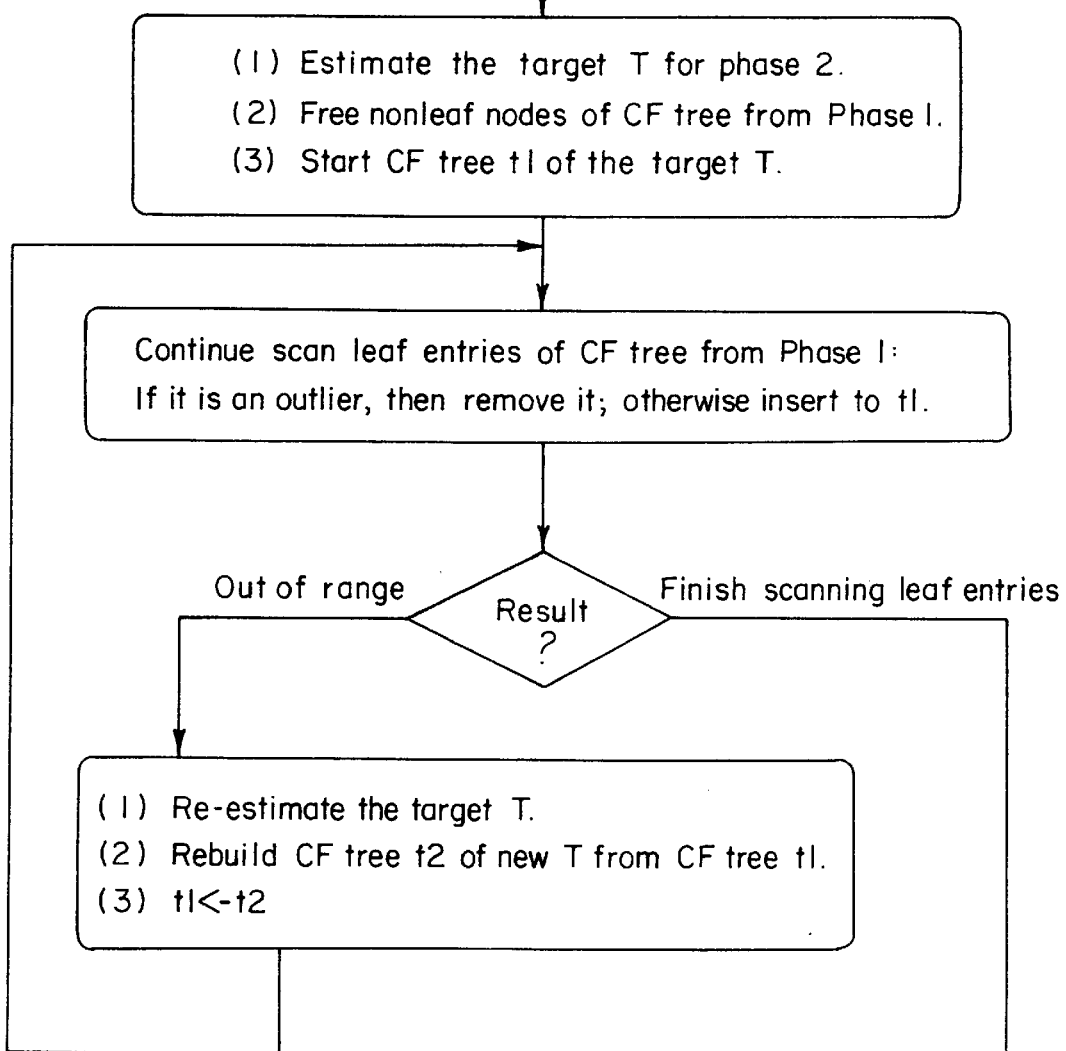
FIG. 7 is a flow chart showing the control flow of phase 2 in the present invention.

FIG. 7 shows the control flow of the optional Phase 2. Its input is the CF tree produced at the end of Phase 1 and its output is a smaller CF tree in which the total number of leaf entries falls below a desired value. Given the threshold value and the number of leaf entries in the tree produced at the end of Phase 1, and the desired number of leaf entries in Phase 3, a new initial (target) threshold value T may be estimated using a heuristic reasoning process. Just as Phase 1 scans all data and builds a CF tree in memory, Phase 2 scans all leaf entries from Phase 1 and builds a CF tree whose total number of leaf entries is under the desired number.

Note that this additional optional phase further eliminates outliers — some entries that were originally entered into a leaf may now be detected to be outliers. This phase also yields a CF tree that is even less sensitive to the original data order than the CF tree of Phase 1, since the entries inserted into it are ordered by clustering locality.

PHASE 3

The undesirable effect of splitting triggered by page size (see above) can produce results unfaithful to the actual clustering patterns in the data. This is remedied in Phase 3 by using a global or semi-global algorithm to cluster all leaf entries. It is possible to use any of the conventional clustering algorithms in this phase. However, since the input is a set of CF vectors, rather than just a set of data points, it is desirable to adapt these algorithms to take advantage of the extra information. (Of course, by using the centroid as the representative of a cluster, each cluster can be treated as a single point and any desired conventional clustering algorithm can then be used without modification.)

Figure 8:
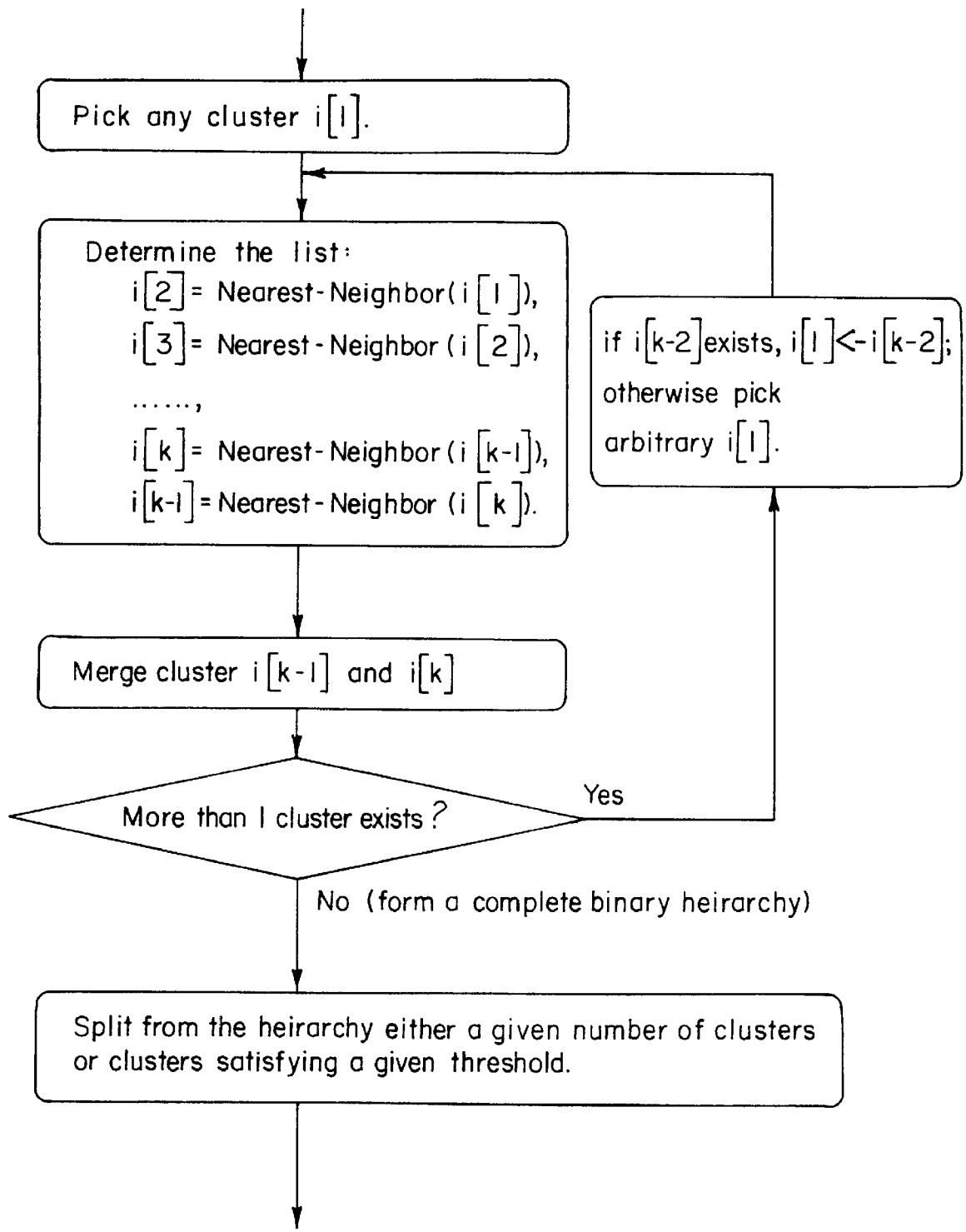
FIG. 8 is a flow chart showing the control flow of a hierarchical clustering algorithm that may be used in phase 3 of the present invention.
Figure 10:
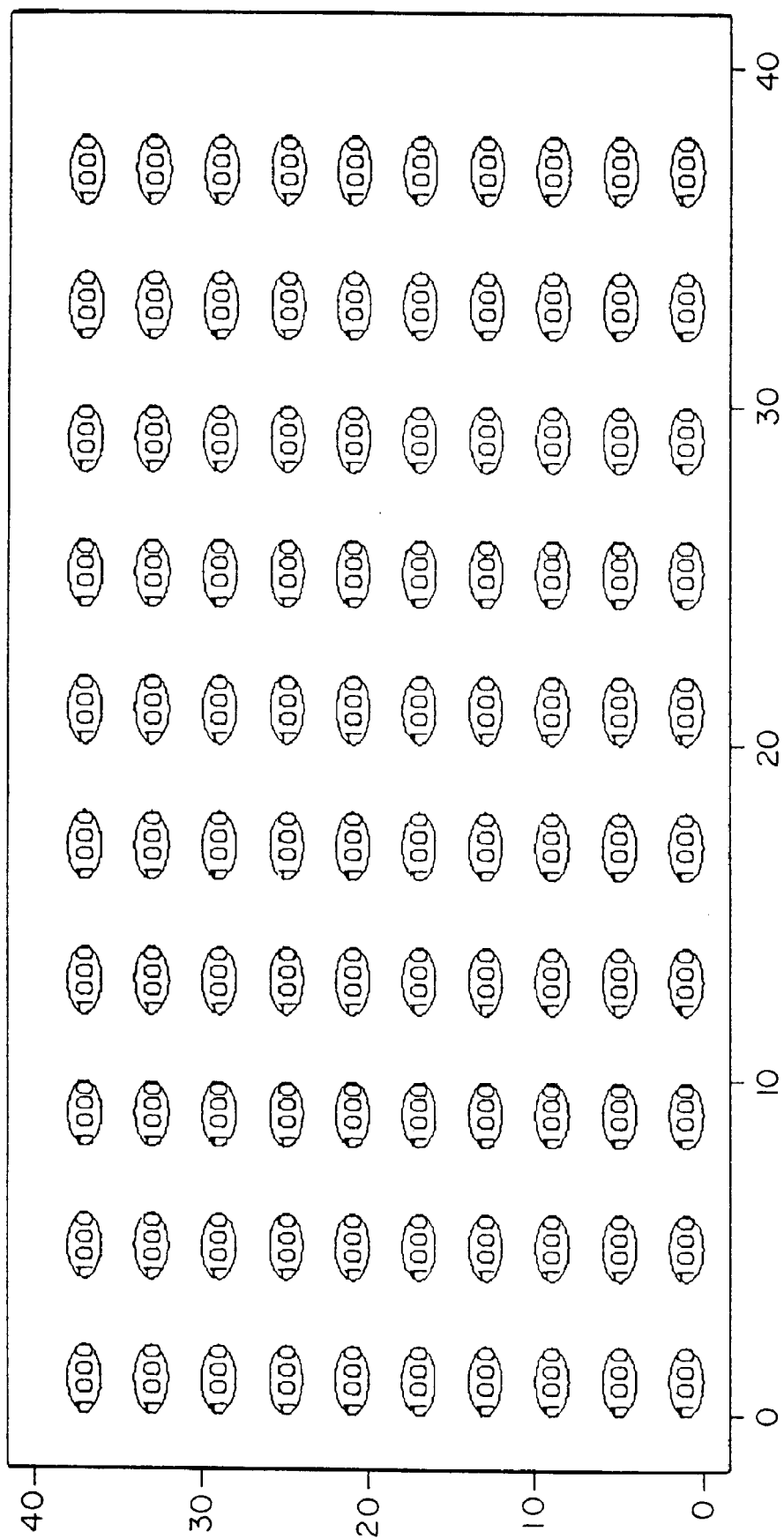
FIG. 10 is an illustrative view of a data set showing an example of intended clusters.
Figure 11:
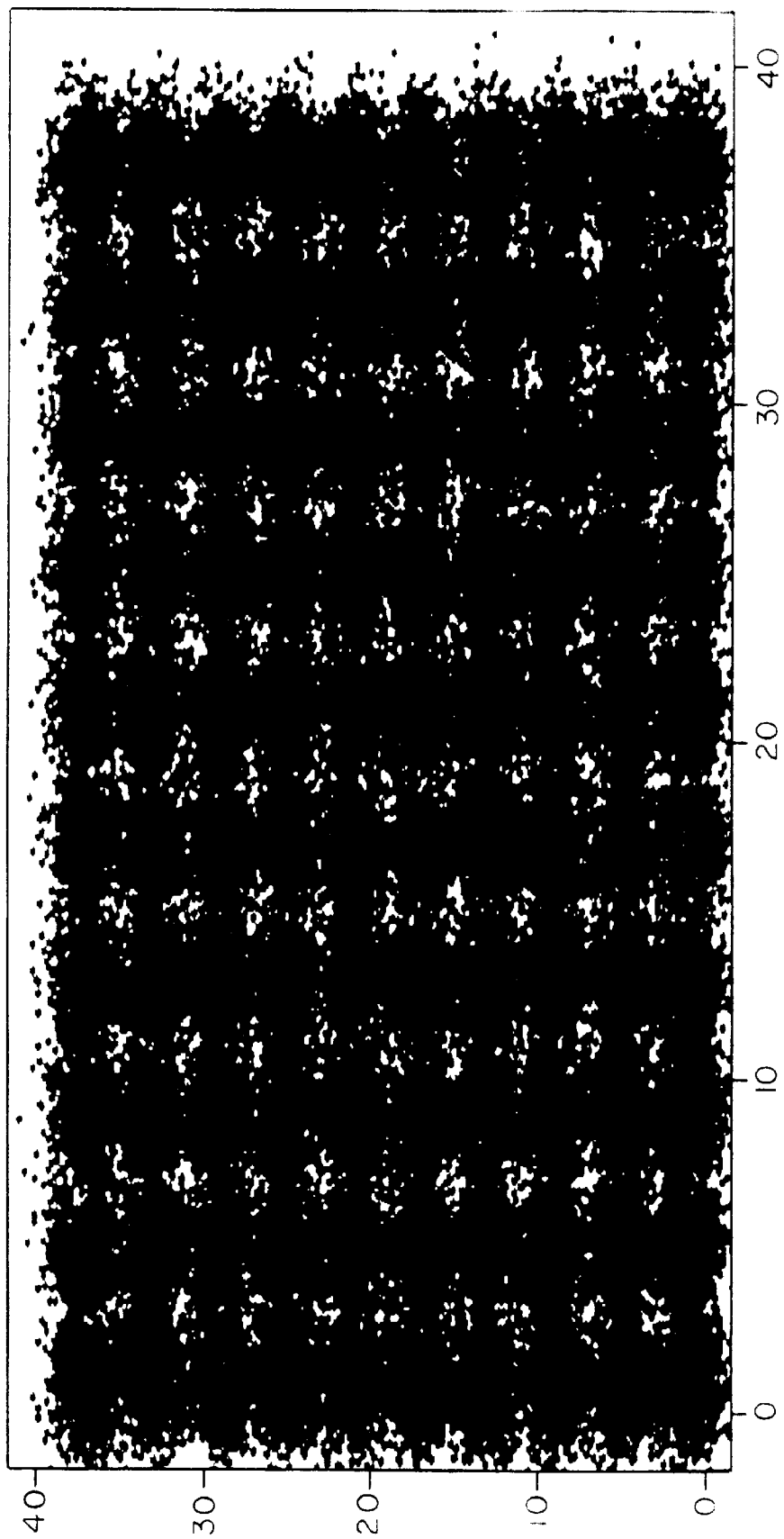
FIG. 11 is an illustrative view of a data set showing actual data on which the invention is carried out to find the intended clusters of FIG. 10.
Figure 12:
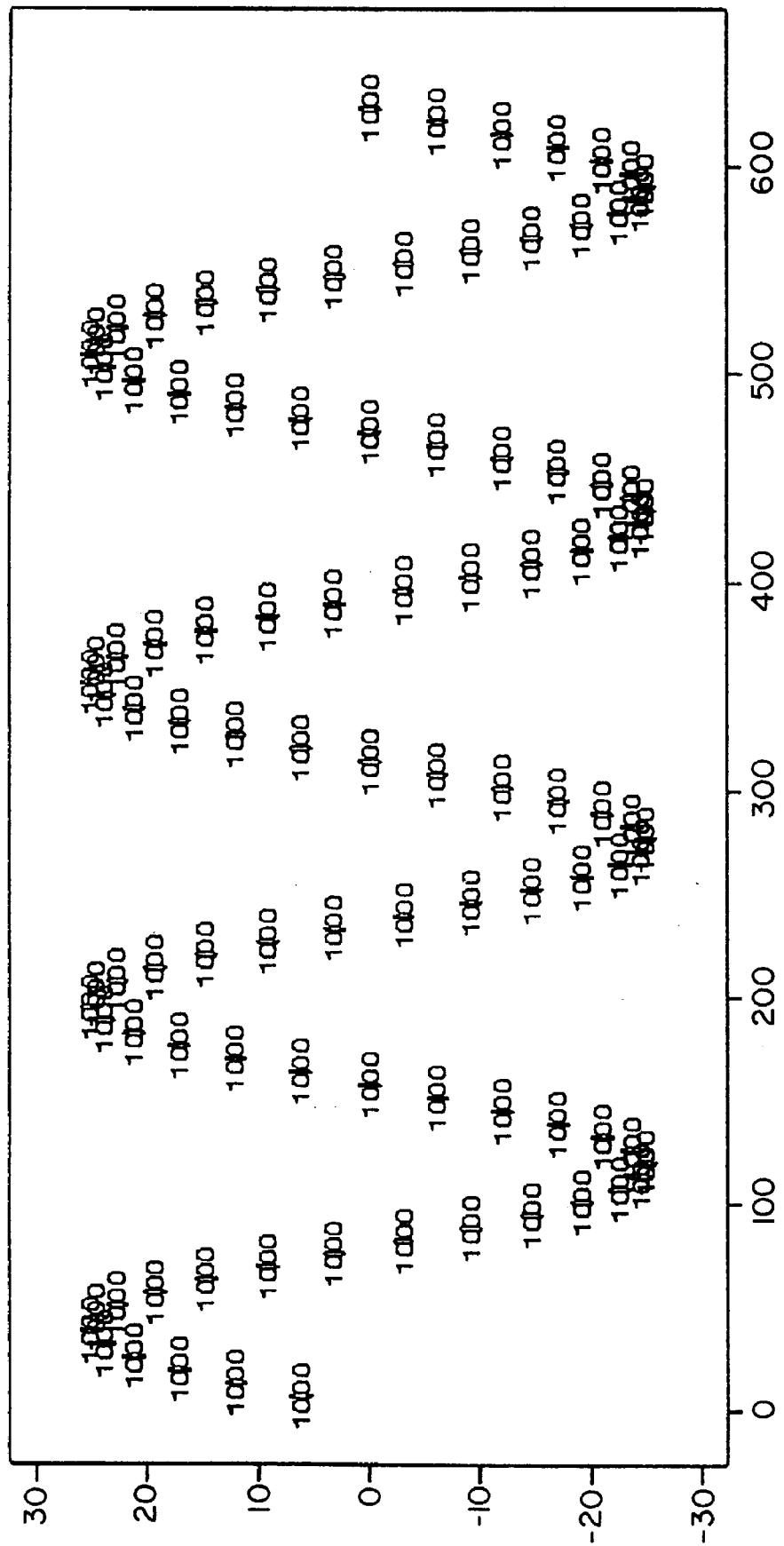
FIG. 12 is another example of intended clusters to be found by the processing of the present invention.
Figure 13:
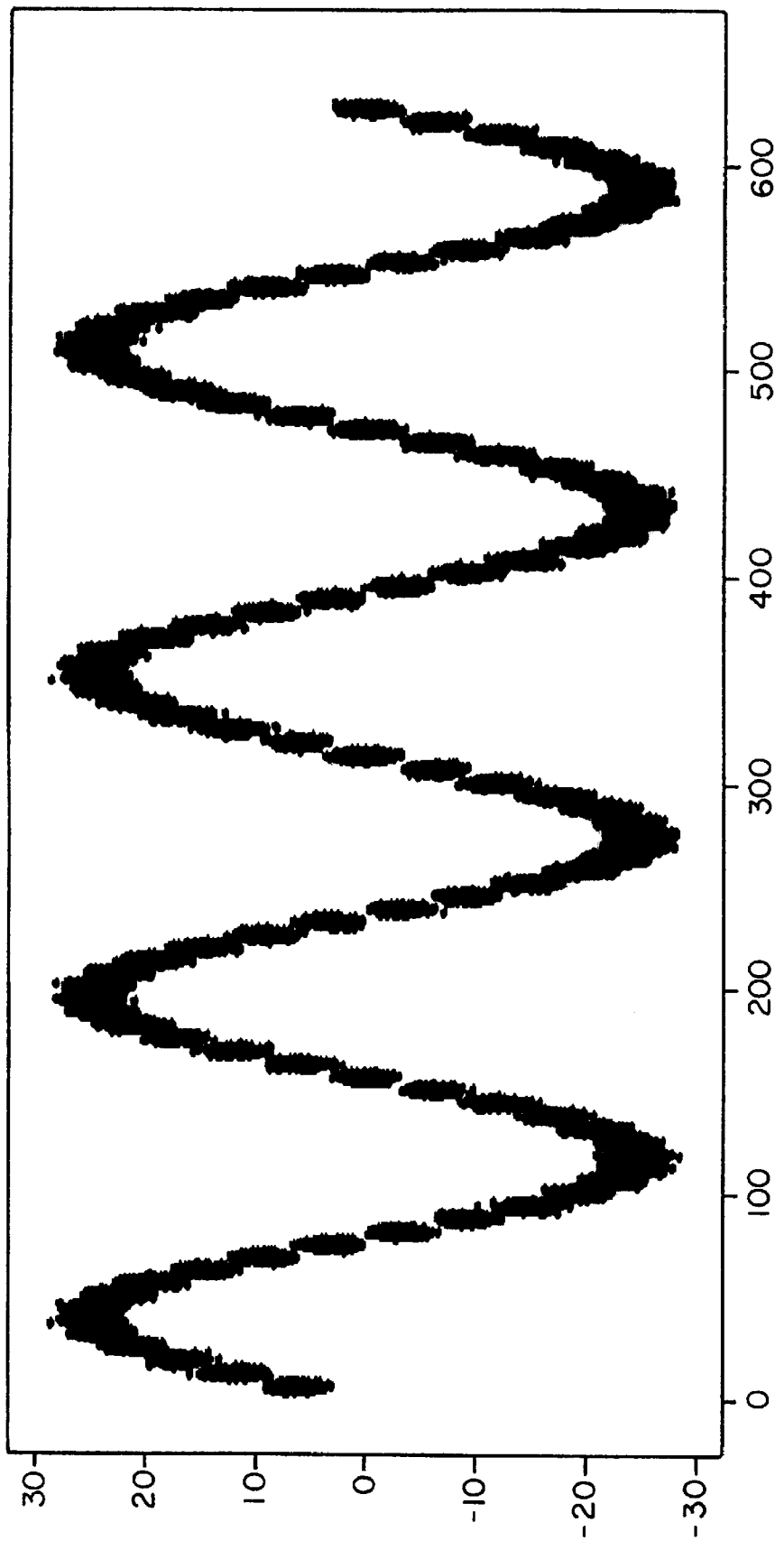
FIG. 13 is the exemplary actual data to be processed by the present invention to find the intended clusters of FIG. 12.
Figure 14:
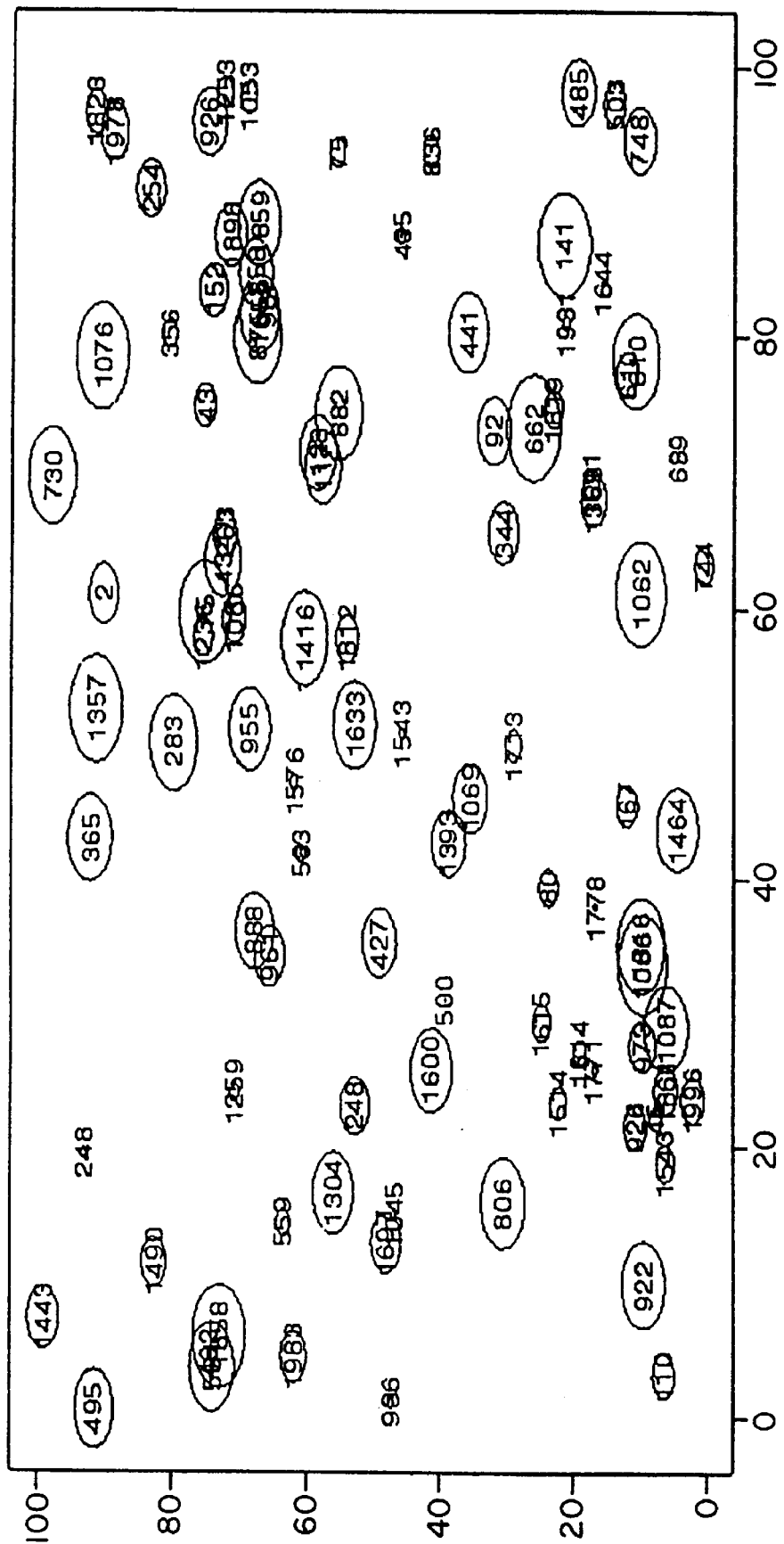
FIG. 14 is a further example of a data set showing intended clusters to be found in the data.
Figure 15:
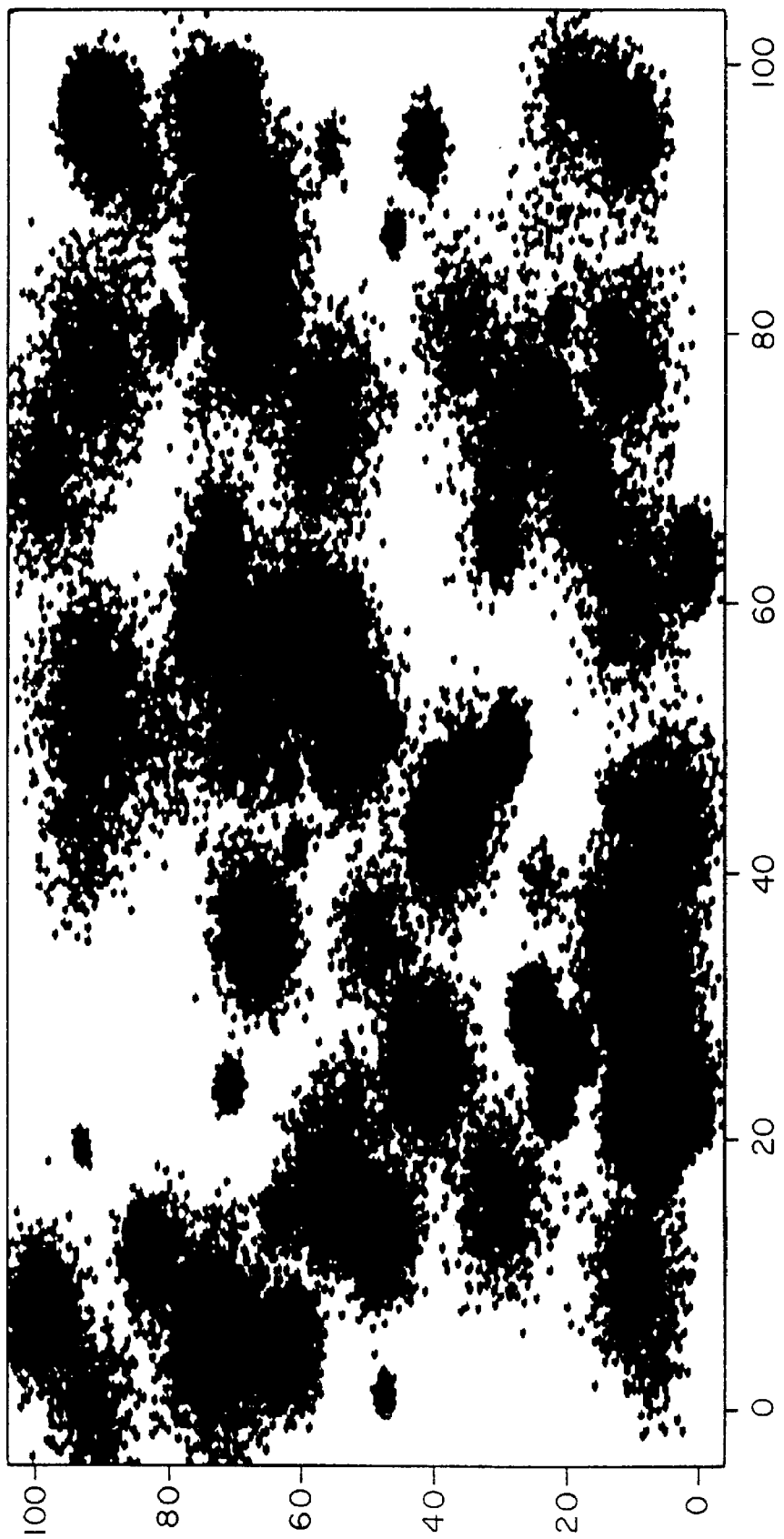
FIG. 15 is an illustrative view of the actual data set to be processed by the present invention to find the clusters of FIG. 14.

Two conventional clustering algorithms are examples of suitable algorithms. An adapted HC algorithm allows the user to find the clusters by specifying the number of clusters, K, or the diameter (or radius) threshold T. FIG. 8 shows the control flow of Phase 3 implemented using an HC algorithm supporting D2 and D4 distance definitions with a time/space complexity of $O(N^2)$. Adapted CLARANS is a random search algorithm applicable to data subclusters instead of just data points. The quality measurement is defined as the average diameter over all clusters. The user must specify the number of clusters, K, in advance.

PHASE 4

The result of Phase 3 is a set of K clusters that captures the major distribution pattern in the data. There are two reasons why the clustering at this point may be capable of improvement. First, Phase 3 utilizes a global algorithm that re-organizes the relative clustering of leaf entries in the tree produced by Phase 2. However, each such leaf entry actually corresponds to a cluster of points in the original data, and it may be that these points should not be clustered together. Second, another undesirable artifact is that if the same data point appears twice in the original dataset, but in different places, the two copies might be entered into distinct leaf clusters.

Both of these problems can be addressed with an additional pass over the data. Note that, up to this point, the original data has only been scanned once, although the tree and outlier information (whose size is at most M+R) may have been scanned multiple times.

Figure 9:
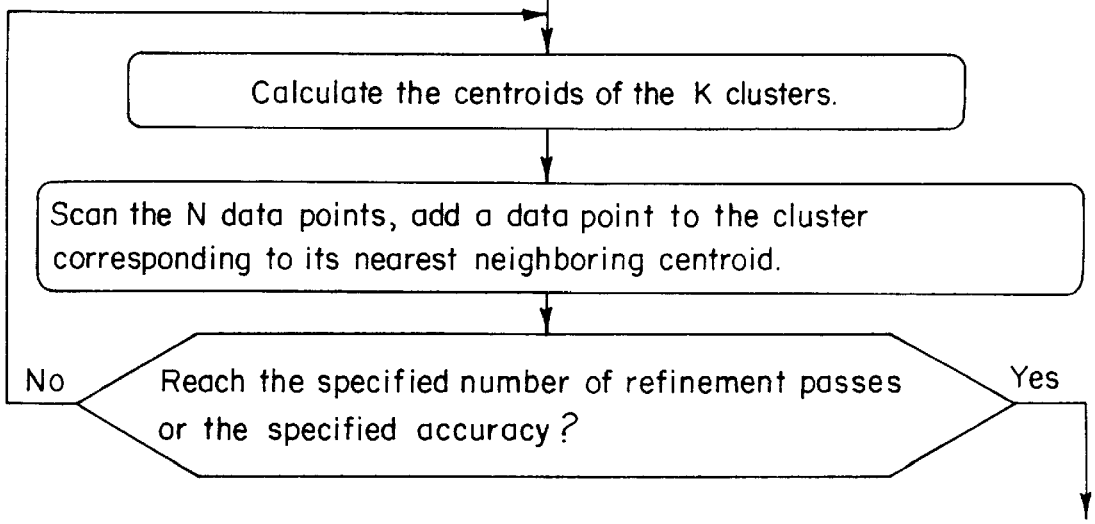
FIG. 9 is a flow chart showing the control flow of a refinement algorithm used in phase 4 of the present invention.

FIG. 9 shows the control flow of Phase 4. Phase 4 uses the centroids of the K clusters produced by Phase 3 as seeds, and redistributes the data points based on the "closest" criterion to obtain a set of K new clusters. Not only does this allow points belonging to a single cluster to migrate, but also it ensures that all copies of a given data point go to the same cluster. As a bonus, during this pass each data point can be labeled with the seed of the cluster that it belongs to, if it is desired to identify the data points in each cluster.

Phase 4 can be extended with further passes if desired. For each additional pass, it is possible to choose the centroids of the new clusters produced by the previous pass as the new seeds. The process converges to a minimum with distortion as the quality measure. Empirically, it is observed that, generally, only a few passes are needed to reach a local minimum, and the first refinement pass is the most effective one. With the clusters from Phase 3 capturing the data overview, and the refinements in Phase 4 correcting the localized misplacement of data points caused by the coarse granularity in Phase 3, the final solution is very likely to be close to the global minimum.

The following presents an example illustrating the performance of the invention.

Suppose that N is the number of data points in the original dataset, M is the available memory in bytes, R is the available disk space in bytes for outlier handling, P is the page size, K is the number of clusters found, TS is the tuple size, ES is the CF entry size, and B is the tree branching factor determined by the page size P, i.e., approximately, P=B * ES. The time spent in Phase 1 under these conditions can be evaluated in the following way. The maximum depth of the tree is $\log_B(M/P)$. To insert a given d-dimensional point, it is necessary to follow a path from root to leaf, touching $1+\log_B(M/P)$ nodes. At each node it is necessary to examine (at most) B entries, looking for the "closest" entry; the cost per entry is proportional to d (since it contains a d-dimensional vector). The cost of this step is, therefore, proportional to $d*N*B(1+\log_B(M/P))$. In case the system runs out of main memory, the system must rebuild the tree. The tree size is at most M/P pages, and there are at most M/ES leaf entries to re-insert. The cost of re-inserting these entries is therefore proportional to $d*M/ES * B(1+\log_B(M/P))$. The number of times the system is forced to re-build the tree (each time incurring the above cost) depends upon the choice of the initial threshold value T and how the threshold is increased, but it is usually possible to keep the number of re-builds to about 5. The analysis of Phase 2 CPU costs is similar. As for I/O, the system scans the data exactly once in Phase 1 and not at all in Phase 2. There is some cost associated with writing out noise entries to disk and reading them back during a re-build. Considering that the amount of disk available for noise handling is typically about 20% of M, and that there are usually no more than about 5 re-builds, the I/O cost of Phase 1 is at most three times the cost of reading in the data, and the I/O cost of Phase 2 is nil. Based on the above analysis — which is actually rather pessimistic — the cost of Phases 1 and 2 scales linearly with N.

There is no I/O in Phase 3, and the input to Phase 3 is always bounded by a given maximum size, thanks to Phase 2. The cost of Phase 3 is therefore bounded by a constant that depends upon the maximum input size chosen for this phase. In Phase 4, the system scans the dataset again and puts each data point in the proper cluster; the time taken is proportional to N*K, which can be further improved with smart "nearest neighbor" solutions, and the I/O cost is one scan of the dataset.

TABLE 1

Descriptions about Datasets

| Dataset | No. Tuples | Noise % | No. Clusters/ Dist. Pattern | |
|---------|-----------|---------|------|------|
| DS1 | 100000 | 0% | 100 | clusters in a 10 × 10 grid |
| DS2 | 100000 | 0% | 100 | clusters along a sine curve |
| DS3 | 97095 | 0% | 100 | clusters created randomly |
| DS4 | 100000 | 10% | 100 | clusters in a 10 × 10 grid |
| DS5 | 100000 | 10% | 100 | clusters along a sine curve |
| DS6 | 117541 | 10% | 100 | clusters created randomly |

Figure 16:
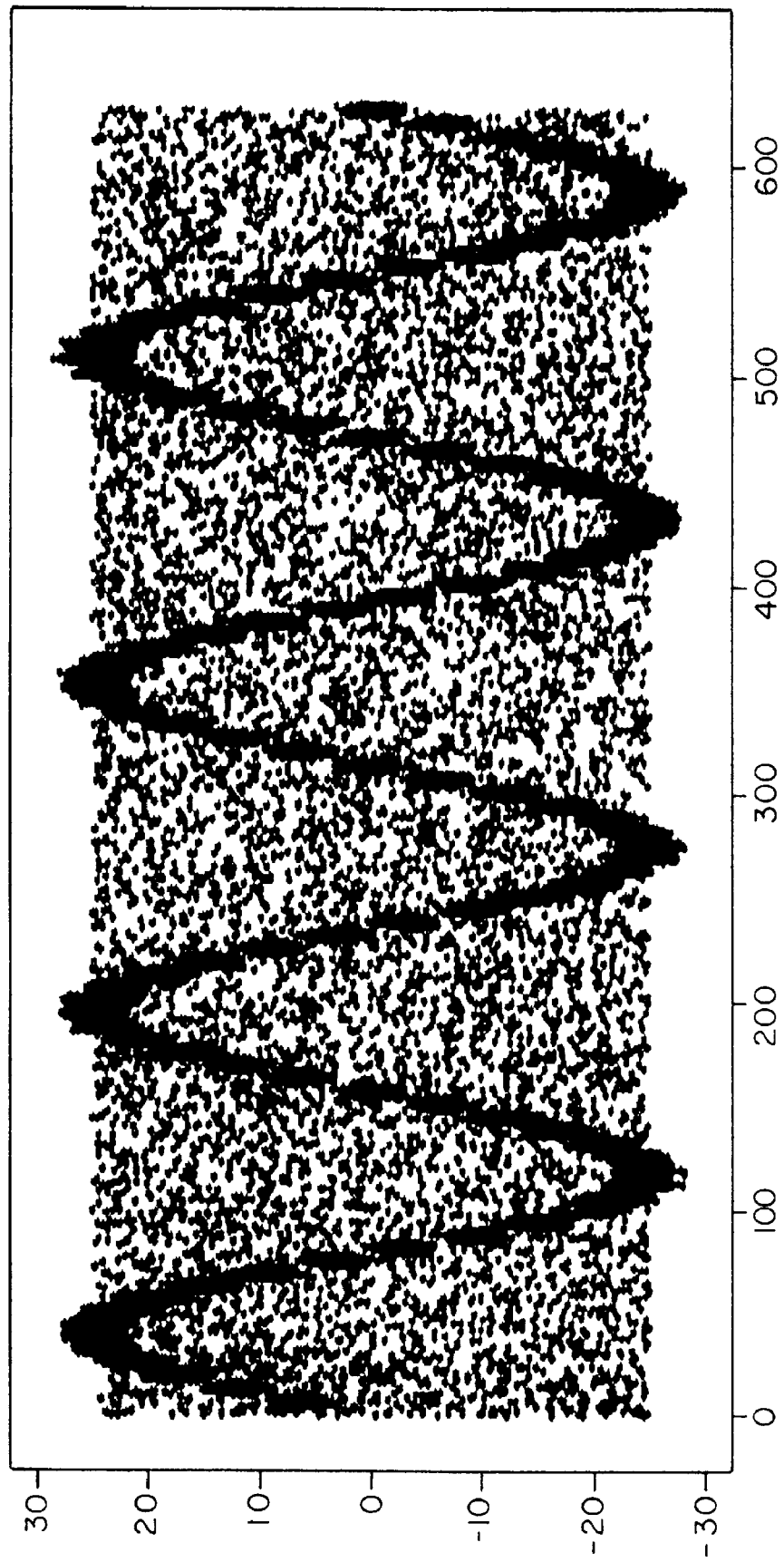
FIG. 16 is a noisy data set example to be processed by the present invention.

Six types of 2-dimensional datasets were created to test the invention. Table 1 above gives brief descriptions of each. Each dataset contains points in a collection of "intended clusters"; the latter three datasets also contain some noise. The data for each intended cluster was generated by a normal distribution random number generator. The noise is distributed uniformly in the data space. DS1, DS2 and DS3 are designed to test how the invention performs on, respectively: (1) a uniform pattern, (2) a skewed pattern, and (3) a random pattern. There is no noise in DS1, DS2 and DS3. Datasets DS4, DS5 and DS6 correspond to DS1, DS2 and DS3, respectively, but about 10% of the data in each of these sets is uniformly distributed "noise". Tuples in a dataset are randomized to avoid any specific input order. FIGS. 10 to 15 provide graphical displays of the intended clusters and the generated data for datasets DS1, DS2 and DS3. In each figure, a cluster is plotted as a circle whose center is the centroid, whose radius is the standard deviation, and whose label is the number of data points. FIG. 16 illustrates dataset DS5, which is essentially dataset DS2 with 10% noise.

There are many possible variations of the invention depending on the selection of the parameters listed above. These include, e.g.: 2 threshold definitions, a threshold for diameter or radius; 4 quality definitions, weighted average diameter or radius of all clusters, weighted total diameters or radii of all clusters; 5 distance definitions, centroid Euclidian distance D0, centroid Manhattan distance D1, average inter-cluster distance D2, average intra-cluster distance D3, and variance increase distance D4; 2 improved global or semi-global algorithms, Adapted HC and Adapted CLARANS (as well as others that may be utilized, if desired). For purpose of exemplification, T may be selected as the threshold for diameter, and clustering quality may be selected as the weighted average diameter of all clusters. In the following, several variations of the invention are discussed, as well as the effect of varying some of the parameters (such as branching factor).

B is an important parameter affecting Phase 1 and Phase 2. From the analysis of the time costs of Phases 1 and 2, it appears that the best value for B is e =2.718. However, such analysis fails to take into account a very important phenomenon: with the same threshold value, the same amount of data and the same data input order, the smaller the value for B, the larger the tree grows. This happens because a smaller B value means less information is available at each level to guide where a newly inserted point belongs in the tree. Thus, a data point that could have been absorbed by an existing leaf entry, if directed to the appropriate leaf, could well go to the wrong leaf node and cause a new leaf entry to be generated. Consequently, with the same amount of memory, and the same threshold estimation, a smaller B value tends to cause more re-builds and eventually requires a higher threshold value, hence affects the clustering efficiency and quality.

Since B is determined by P, Table 2 below shows P's effects on Phase 1 and final clustering quality for datasets DS1, DS2 and DS3. It suggests that smaller (larger) B values decrease (increase) Phase 1 time but degrade (improve) the final cluster quality. These experiments suggest that P=1024 is a good choice for the test datasets and this page size is used for the remaining experiments.

TABLE 2

Branching Factor and Page Size Effects

| DS1 P | Phase 1 Time (sec) | Phase 1 Entries | Phase 1 Threshold | Final Quality |
|---|---|---|---|---|
| 64 | 19.12 | 87 | 4.51948 | 2.8154 |
| 256 | 17.89 | 482 | 2.03387 | 1.8871 |
| 1024 | 26.96 | 1033 | 1.35444 | 1.88109 |
| 4096 | 49.74 | 1145 | 1.07137 | 1.88023 |

| DS2 P | Phase 1 Time (sec) | Phase 1 Threshold | Phase 1 Entries | Final Quality |
|---|---|---|---|---|
| 64 | 20.38 | 221 | 4.51818 | 2.00592 |
| 256 | 16.99 | 176 | 2.33908 | 1.99794 |
| 1024 | 27.26 | 1473 | 1.58284 | 1.99792 |
| 4096 | 43.53 | 1671 | 1.34242 | 1.99792 |

| DS3 P | Phase 1 Time (sec) | Phase 1 Threshold | Phase 1 Entries | Final Quality |
|---|---|---|---|---|
| 64 | 21.84 | 238 | 6.22641 | 4.02912 |
| 256 | 18.17 | 1169 | 2.99922 | 3.50851 |
| 1024 | 26.24 | 1215 | 2.38206 | 3.36464 |
| 4096 | 48.66 | 1372 | 2.08865 | 3.26607 |

The distance definitions D0, D1, D2, D3 and D4 may now be considered. Suppose that in Phase 1 and Phase 2 we use $D_i$, and in Phase 3 we use $D_j$. All 25 combinations were used for clustering datasets DS1, DS2 and DS3 using the present invention. It was found from this experiment that D3 should not be used in Phase 1 and Phase 2. Use of D3 in Phase 1 and 2 tends to require more re-builds and a higher threshold value to finish, which degrades efficiency and quality. There are no significant differences for other combinations.

The disk space R for outliers is assumed to be less than M because the outlier entries should never exceed the normal leaf entries stored in the CF tree. Intuitively, outliers are supposed to be the "noise" in the data. If the outlier entries do exceed the normal entries, then it is very likely that the threshold value is too small, and some meaningful entries are misclassified as outliers. By increasing the threshold and re-building the tree, entries currently classified as outliers can be reabsorbed. In the experiments, as a rule of thumb, it seems reasonable to set M=5% of N*TS and R=20% of M. In the experiments, the option of noise handling is provided, and a leaf entry is considered to be noise if it contains less than 25% of the average number of data points per leaf entry.

As noted above, the use of medoids as cluster representatives tends to distort the clustering if the medoid is not centrally located. Table 3 below shows the performance differences between using Adapted-HC and using Adapted-CLARANS in Phase 3. Adapted-HC is slower but more accurate. It is used for all the remaining examples described below.

TABLE 3

Performance Differences between Adapted-HC and Adapted-CLARANS

| Dataset | Adapted-HC Time (sec) | Quality | Adapted-CLARANS Time (sec) | Quality |
|---|---|---|---|---|
| DS1 | 109.44 | 1.88109 | 51.11 | 2.0756 |
| DS2 | 46.09 | 1.99792 | 45.18 | 2.32123 |
| DS3 | 62.38 | 3.36464 | 46.36 | 4.65939 |

Figure 17:
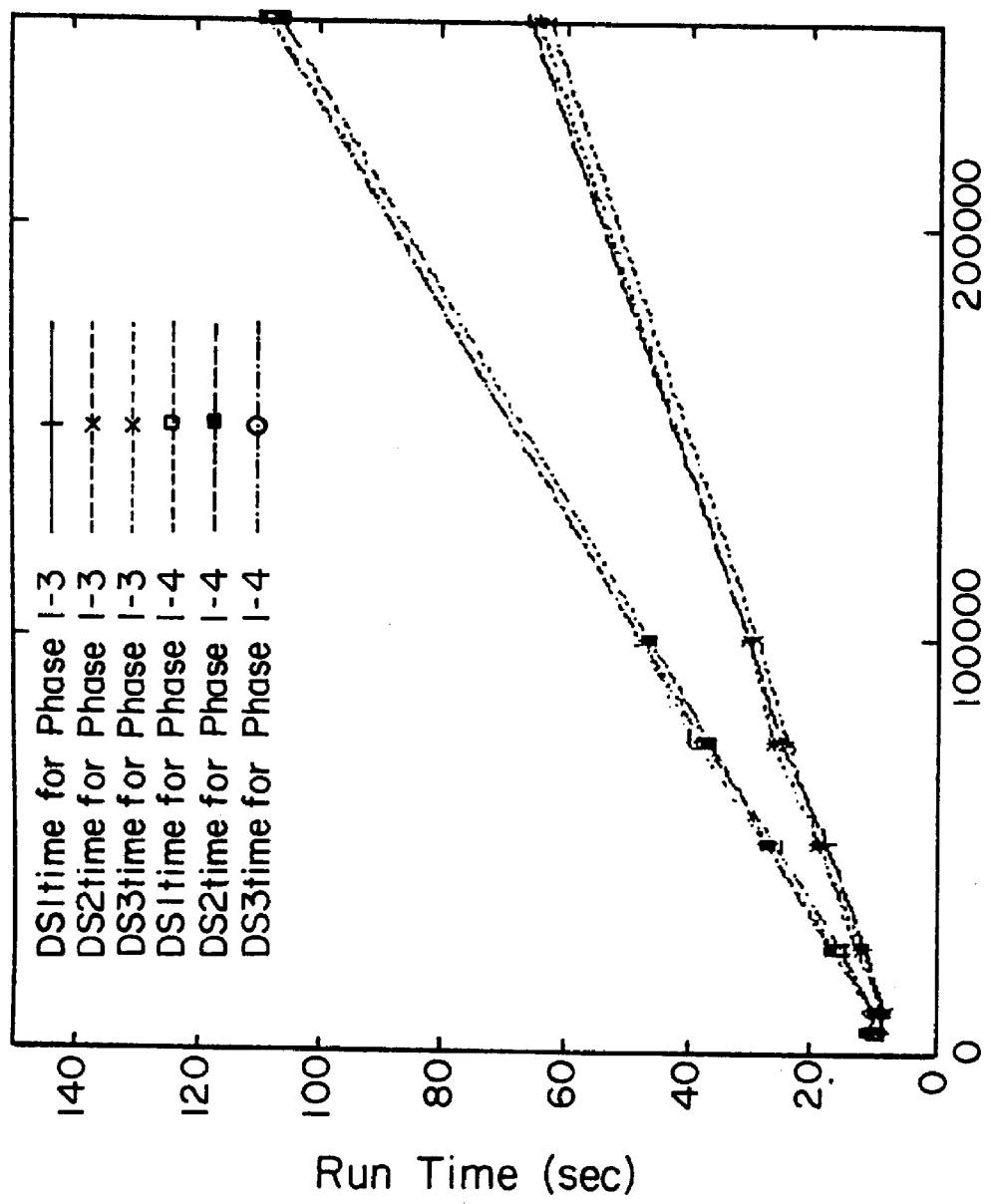
FIG. 17 is a graph illustrating the scalability of the present invention with respect to an increasing number of data points per cluster.

Two distinct ways of increasing the dataset size were used to test the scalability of the present invention. For each of DS1, DS2 and DS3, a range of datasets were created by keeping all the dataset parameters the same except for increasing the number of data points in each cluster, or in other words, the lower and higher bounds for the number of points in each cluster, $n_l$ and $n_h$. Table 4 shows the type of dataset, $n_l$ and $n_h$, the dataset size N, the total running time for all 4 phases, and the quality ratio (the average diameter of clusters found by the present invention), $\overline{D}$, divided by the actual diameter of real clusters in the dataset, $\overline{D}_{act}$). In FIG. 17, the times are plotted against the dataset size N to show the present invention is linearly scalable as N grows this way.

TABLE 4

Scalability with Respect to Increasing $n_l$ and $n_h$

| Dataset | $n_l, n_h$ | N | Time | $\frac{\overline{D}}{\overline{D}_{act}}$ |
|---|---|---|---|---|
| DS1 | 50..50 | 5K | 9.78 | $\frac{1.94}{2.03}$ |
|  | 100..100 | 10K | 9.65 | $\frac{1.88}{2.00}$ |
|  | 250..250 | 25K | 15.3 | $\frac{1.88}{2.01}$ |
|  | 500..500 | 50K | 25.67 | $\frac{1.86}{1.99}$ |
|  | 750..750 | 75K | 37.47 | $\frac{1.87}{2.00}$ |
|  | 1000..1000 | 100K | 47.64 | $\frac{1.87}{2.00}$ |

TABLE 4-continued

Scalability with Respect to Increasing $n_l$ and $n_h$

| Dataset | $n_l, n_h$ | N | Time | $\frac{D}{\overline{D}_{act}}$ |
|---|---|---|---|---|
| | 2500..2500 | 250K | 108.56 | 1.87 / 2.00 |
| DS2 | 50..50 | 5K | 10.48 | 1.98 / 1.99 |
| | 100..100 | 10K | 9.54 | 1.97 / 1.98 |
| | 250..250 | 25K | 16.9 | 1.99 / 1.99 |
| | 500..500 | 50K | 27.21 | 1.99 / 1.99 |
| | 750..750 | 75K | 36.4 | 2.00 / 2.00 |
| | 1000..1000 | 100K | 46.25 | 1.99 / 2.00 |
| | 2500..2500 | 250K | 106.29 | 1.99 / 2.00 |
| DS3 | 0..100 | 5K | 9.18 | 4.10 / 4.42 |
| | 0..200 | 10K | 10.13 | 3.73 / 4.78 |
| | 0..500 | 25K | 16.11 | 3.53 / 4.65 |
| | 0..1000 | 50K | 27.39 | 3.34 / 4.27 |
| | 0..1500 | 75K | 38.9 | 3.35 / 4.22 |
| | 0..2000 | 100K | 47.87 | 3.73 / 4.60 |
| | 0..5000 | 250K | 108.11 | 3.69 / 4.52 |

As for quality stability, in Table 4, since each result is obtained with a distinct dataset, the stability of the $\overline{D}$'s does not directly indicate the present invention's stability. The stability of $\overline{D}$'s can be affected by both the dataset and the present invention's stability. If the $\overline{D}_{act}$'s is taken as a rough indication of the dataset stability, then when the datasets are relatively stable, such as the DS1 group or the DS2 group, (as their $\overline{D}_{act}$'s are stable), it may be concluded that the present invention has a very stable clustering because the $\overline{D}$'s of the clusters found by it are stable for these datasets.

Figure 18:
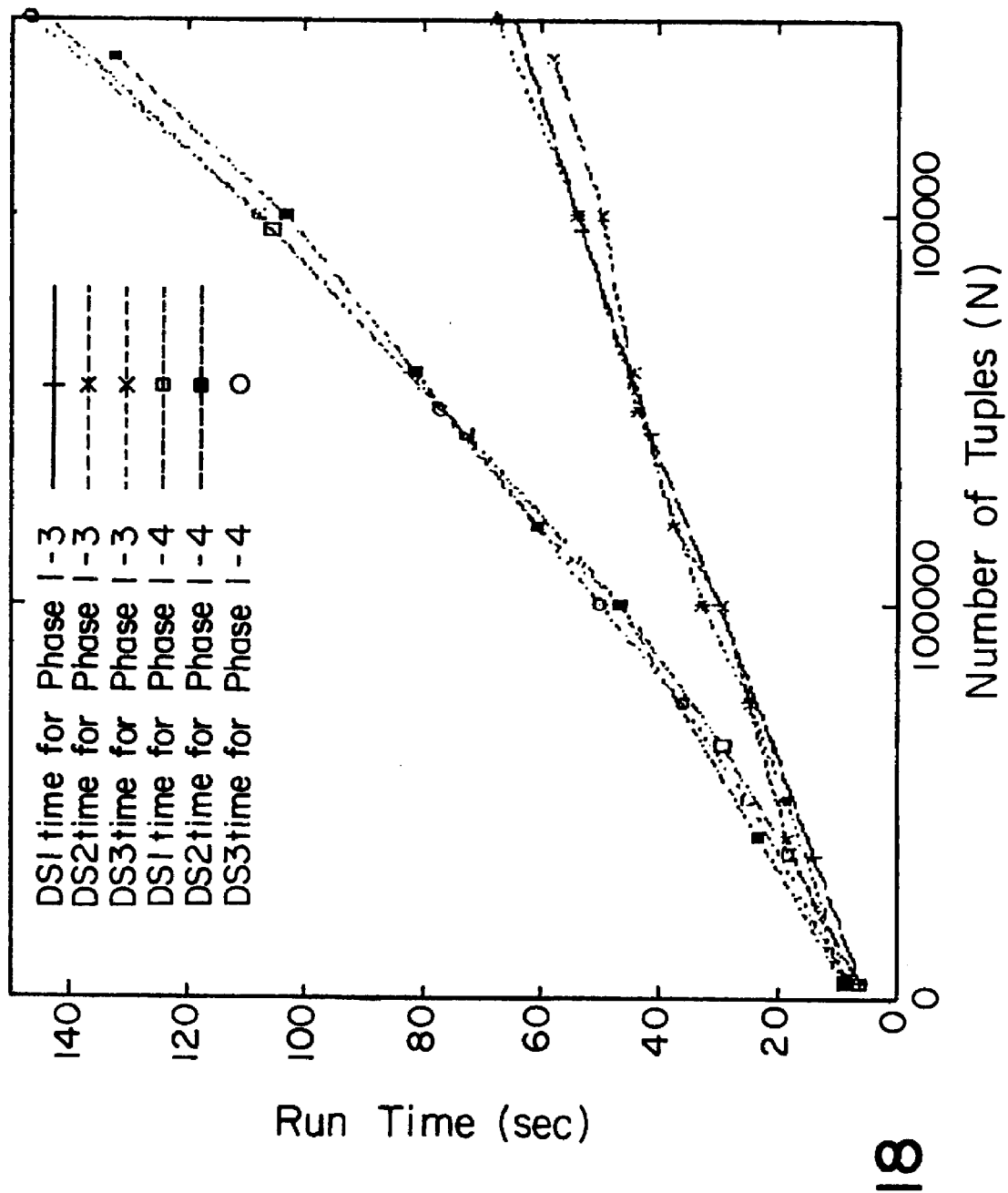
FIG. 18 is a graph illustrating the scalability of the present invention with respect to an increasing number of clusters.
Figure 19:
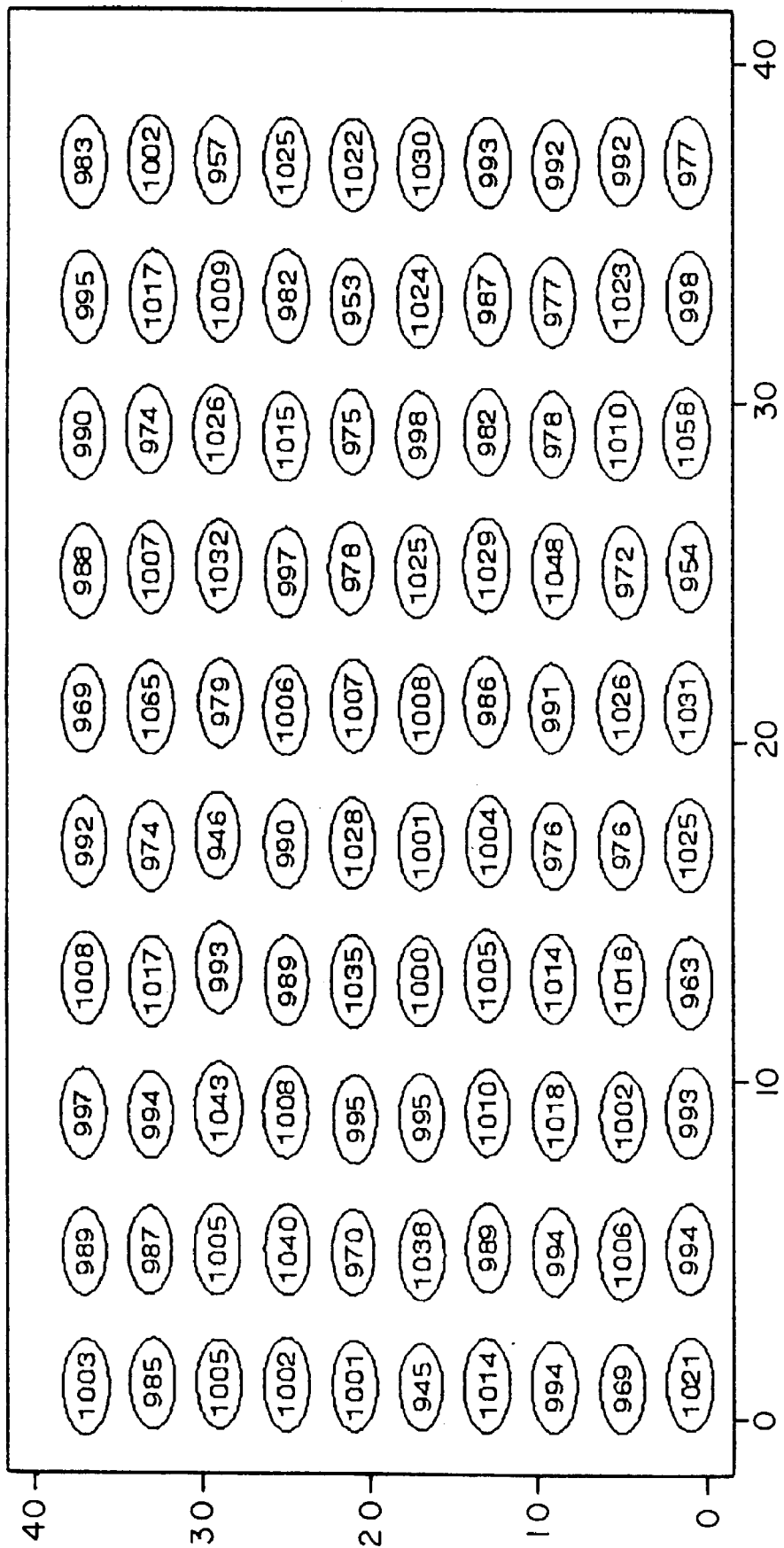
FIG. 19 is an illustrative view of the results of the cluster processing carried out by the present invention on the data of FIG. 11 wherein the intended clusters to be found are illustrated in FIG. 10.
Figure 20:
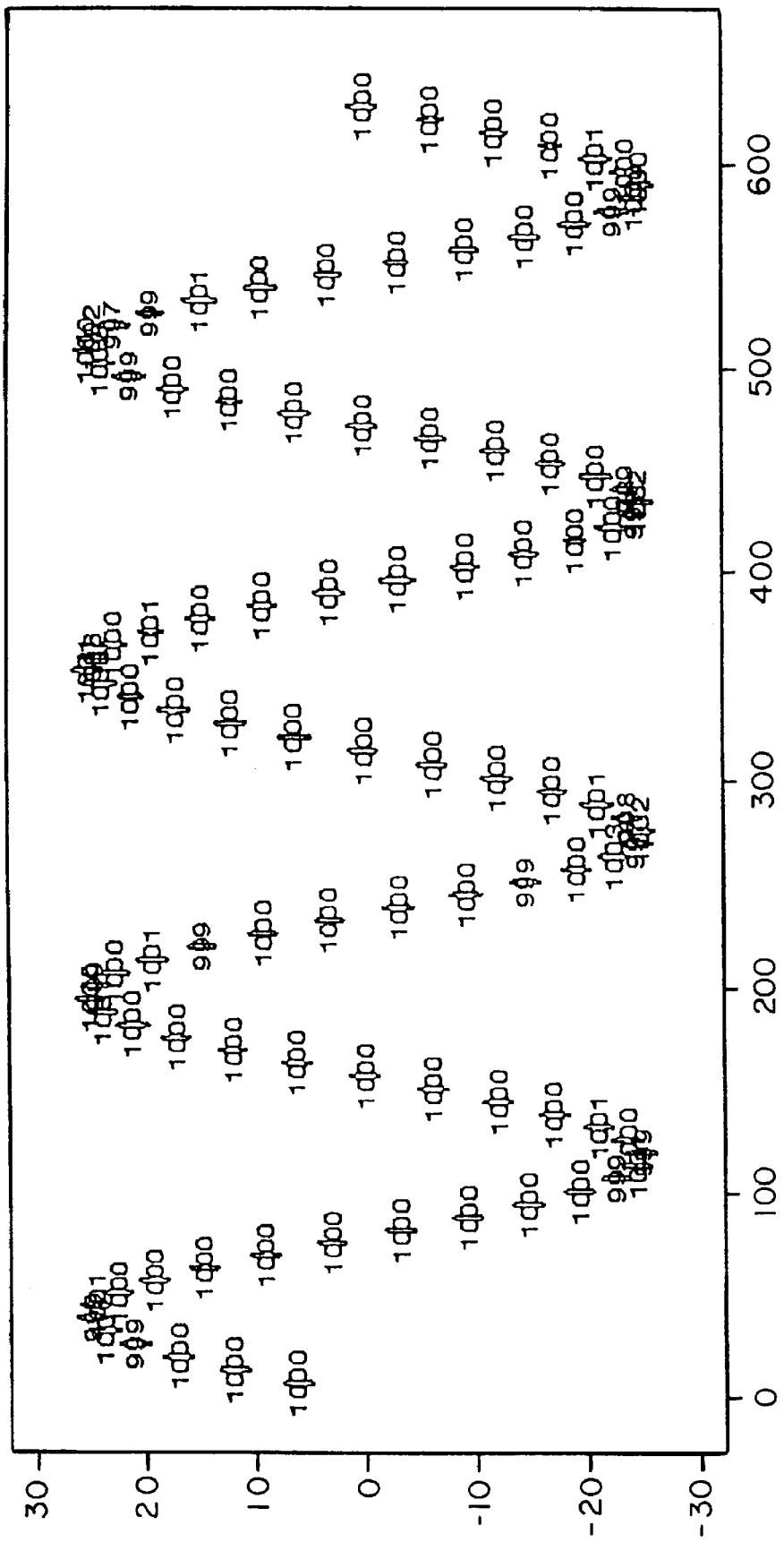
FIG. 20 is an illustration of the results of the clustering obtained by the present invention on the data set of FIG. 13.
Figure 21:
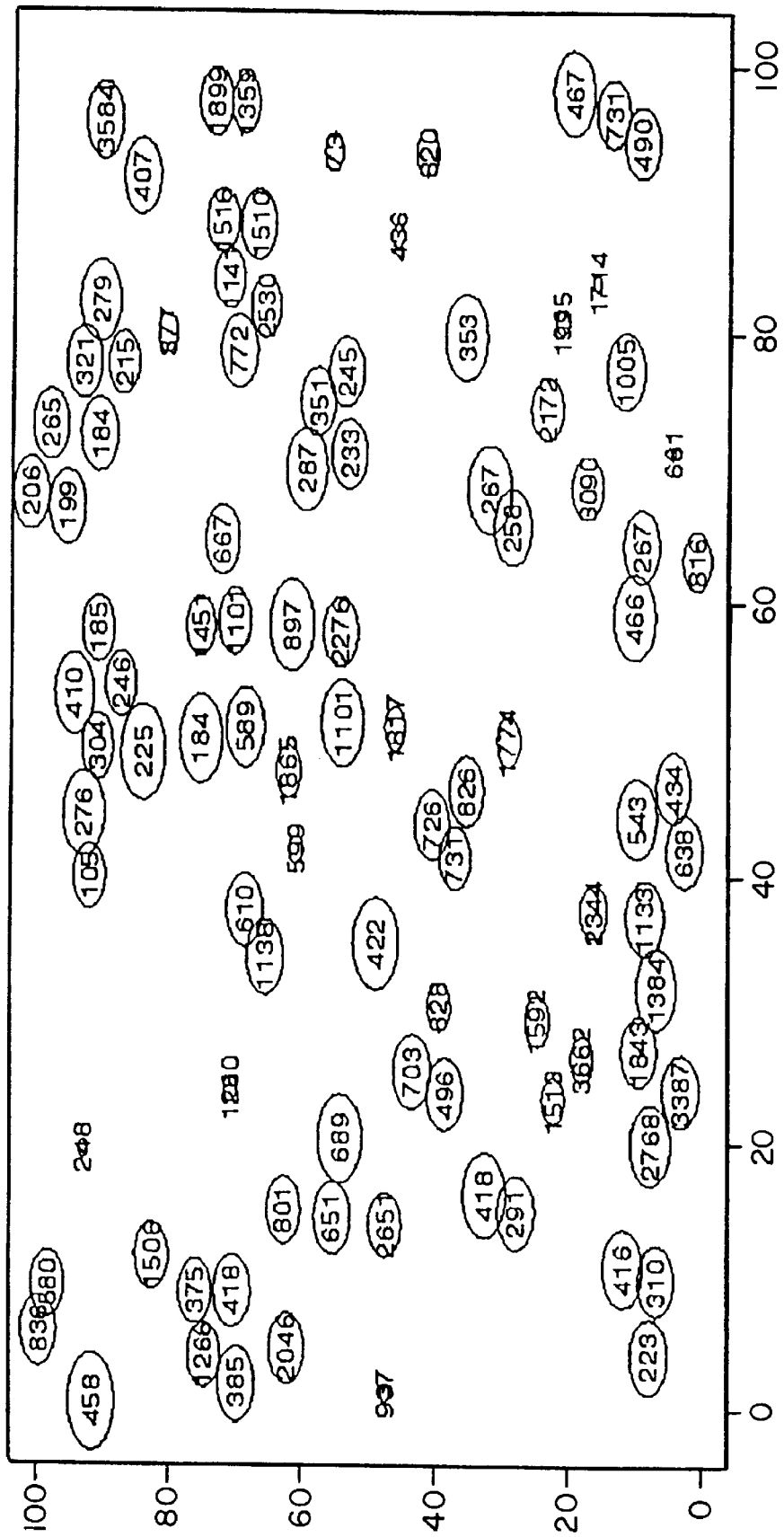
FIG. 21 is an illustrative view of the results of the clustering of the present invention on the data set of FIG. 15.

For each DS1, DS2 and DS3, a range of datasets was also created by keeping all the dataset parameters the same except for increasing the number of clusters, K. Table 5 shows the type of dataset, K, the dataset size N, the running time for the first 3 phases, as well as for all 4 phases and the quality ratio. In FIG. 18, the times are plotted against N to show that the running time for the first 3 phases is linearly scalable as N grows this way. Since both N and K are growing, and Phase 4's complexity is now O(K*N) (it can be improved using smart "Nearest Neighbor" solutions to almost reach the linear scalability), the total time is not strictly linear with N. As for the quality stability, the similar conclusion can be reached that when the datasets are stable (as indicated by their $\overline{D}_{act}$'s), the present invention is shown to have a very stable clustering quality while scaling up.

TABLE 5

Scalability with Respect to Increasing K

| Dataset | K | N | Time$^{(1-3)}$ | Time | $\frac{D}{\overline{D}_{act}}$ |
|---|---|---|---|---|---|
| DS1 | 4 | 4K | 5.91 | 6.24 | 1.92 / 2.00 |
| | 36 | 36K | 14.08 | 17.94 | 1.89 / 2.00 |
| | 64 | 64K | 20.65 | 29.18 | 1.87 / 1.99 |
| | 100 | 100K | 29.77 | 46.43 | 1.87 / 2.00 |
| | 144 | 144K | 41.5 | 72.66 | 1.87 / 2.00 |
| | 196 | 196K | 53.06 | 105.64 | 1.87 / 2.00 |
| | 256 | 256K | 65.88 | 148.03 | 1.87 / 2.00 |
| DS2 | 4 | 4K | 8.48 | 8.8 | 1.98 / 1.99 |
| | 40 | 40K | 18.4 | 23.06 | 1.99 / 2.00 |
| | 100 | 100K | 29.2 | 46.68 | 1.99 / 2.00 |
| | 120 | 120K | 37.49 | 60.54 | 1.99 / 1.99 |
| | 160 | 160K | 44.66 | 81.41 | 2.00 / 2.00 |
| | 200 | 200K | 49.73 | 103.38 | 2.00 / 2.00 |
| | 240 | 240K | 59.97 | 132.29 | 2.00 / 2.00 |
| DS3 | 5 | 5K | 8.27 | 8.68 | 5.26 / 6.43 |
| | 50 | 50K | 18.54 | 24.76 | 3.24 / 4.52 |
| | 75 | 75K | 24.51 | 36.08 | 3.48 / 4.76 |
| | 100 | 100K | 32.58 | 50.13 | 3.64 / 4.57 |
| | 150 | 150K | 43.52 | 76.97 | 3.69 / 4.26 |
| | 200 | 200K | 53.86 | 107.67 | 4.32 / 4.49 |
| | 250 | 250K | 67.56 | 146.8 | 4.84 / 4.98 |

TABLE 6

Performance of the
Clustering System of the Invention

| | CLUSTERING SYSTEM | | |
|---|---|---|---|
| Dataset | Time (sec) | Quality | Space Used (bytes) |
| DS1  | 109.44 | 1.88109 | 80*1024 |
| DS1' | 148.54 | 1.87865 | 80*1024 |
| DS2  | 46.09  | 1.99792 | 80*1024 |
| DS2' | 122.28 | 1.99792 | 80*1024 |
| DS3  | 62.38  | 3.36464 | 80*1024 |
| DS3' | 141.05 | 3.67888 | 80*1024 |

Table 6 presents the performance of the present invention with respect to running time, clustering quality, space needed to do the clustering and input order sensitivity. In the table, DS1', DS2' and DS3' are DS1, DS2 and DS3, respectively, but input in an order that reflects the clustering locality. They are used to test the input order sensitivity of the present invention. Besides the numeric quality measurements shown in the table, FIGS. 19 to 22 provide visual results of the clusters found by the system of the present invention for the data sets of FIGS. 11, 13, 15 and 16.

Figure 22:
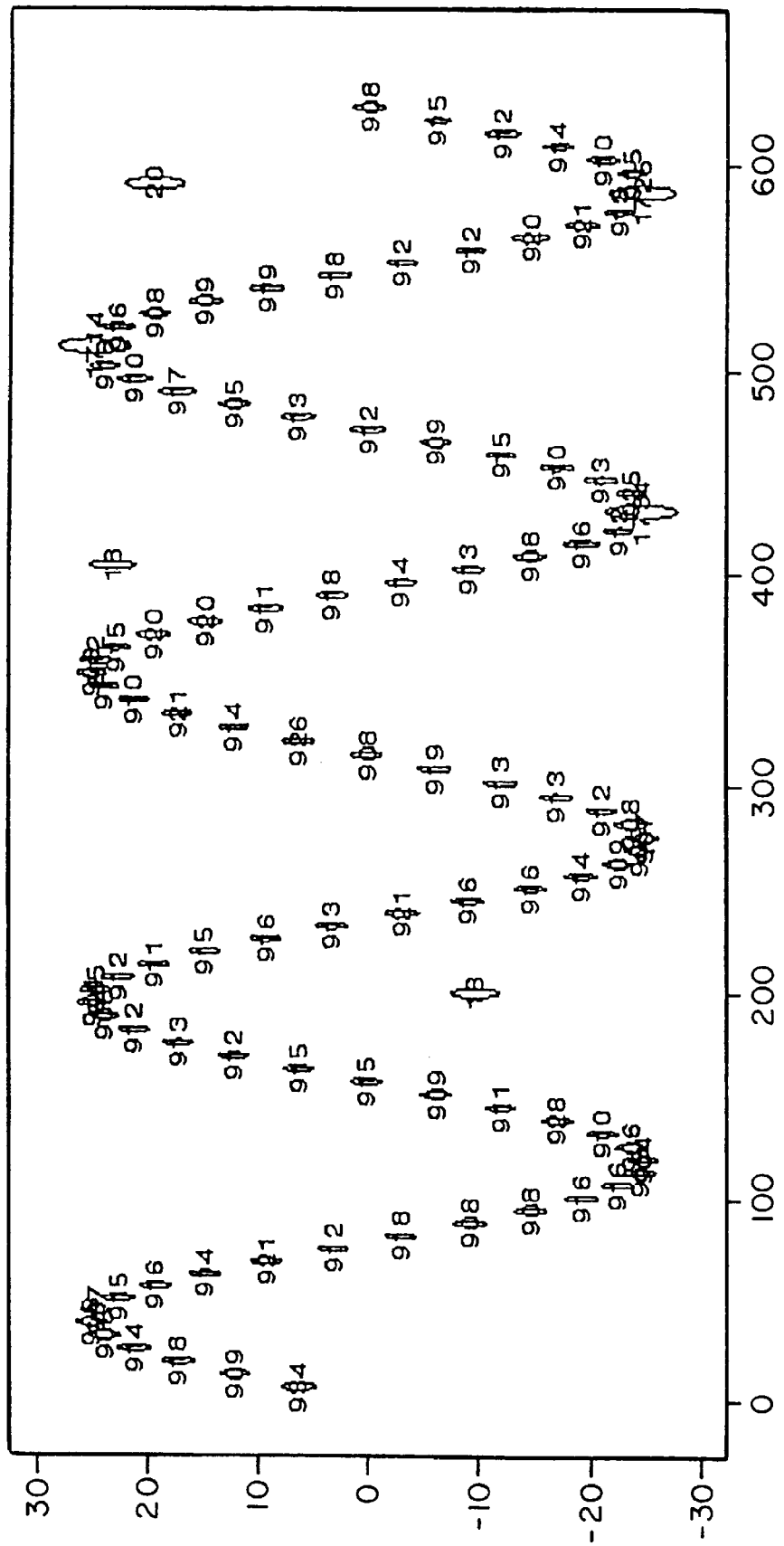
FIG. 22 is an illustrative view of the results of the clustering with the present invention on the noisy data set of FIG. 16.

The following illustrates how important noise handling is in the clustering process. Table 7 illustrates the performance of the present invention on noisy datasets with respect to running time. The system of the present invention discards some of the data points as noise when the noise handling option is chosen. It is not clear whether ignoring points classified as "noise" results in loss of some clustering information. Nonetheless, FIG. 22 provides a visual quality illustration of the clusters found by the present invention in a noisy data set (Fig. 16). It is apparent from this figure that the present system with noise handling is noise-robust.

TABLE 7

Performance of the
Present Invention with Noise Handling

| Dataset | CLUSTERING SYSTEM Time (sec) |
|---|---|
| DS4  | 117.16 |
| DS4' | 145.22 |
| DS5  | 47.81  |
| DS5' | 75.69  |
| DS6  | 71.34  |
| DS6' | 83.95  |

In summary, the present invention is a clustering method well suited for very large datasets. It reduces a large clustering problem by removing outliers and concentrating on densely occupied portions of the data space. A height-balanced tree is used for clustering, and utilizes measurements that capture the natural closeness of data. These measurements can be stored and updated incrementally, and the invention achieves O(M) space complexity and $O(dNBlog_B(M/P))$ time complexity. The I/O complexity is little more than one scan of data, $O(N*TS/P)$. Experimentally, the invention is shown to perform very well on several large datasets.

The architecture of the present invention allows interactive and dynamic performance tuning, and parallel programming. For example, one way of parallelizing the method of the invention is to hash the original data into H groups and run Phase 1 on each of the H groups in parallel. Thus, the complexity of Phase 1 is improved from $dNB(1+log_B(M/P))$ to $d(N/H) B*(1+log_B(M/PH))$. Then, all leaf entries in the H subtrees can be fed to Phase 2.

The clusters produced by the invention have a uniform format. They can be stored, sorted, indexed and queried by any traditional database systems. For example, one can use SQL to ask questions such as the following: What is the largest cluster? What percentage of data is in the largest cluster? How many clusters are there? How many clusters contain 90% of data?

With the invention identifying the crowded places as clusters, for instance, it is possible to go further to explore the global patterns of these clusters. One immediate approach is to apply "regression" procedures on the resulting clusters to extract such patterns. Another potential application is to use the results obtained by the invention to help cluster-based index building, data retrieval and query optimization.

In a further embodiment of the invention for carrying out image processing, the instrument 51 (FIG. 1) comprises a CCD camera, and the processor 60 is an HP9000/720 PA-RISC. The results of the image processing in the processor 60 are printed out on a printer 68 having color printing capacity. The following example describes the data collection and the intended objectives of the processing, and the manner in which the cluster processing of the present invention is carried out by the processor 60 to obtain filtered images.

Figure 23:
FIG. 23 is an image of a scene of trees with a partly cloudy sky background taken in the near infrared band.
Figure 24:
FIG. 24 is an image of the same scene as in FIG. 23 taken in the visible wavelength band.

FIGS. 23 and 24 are two similar images of trees with a partly cloudy sky as the background, taken in two different wavelengths. FIG. 23 is in the near-infrared band (NIR), and FIG. 24 is in the visible wavelength band (VIS). Each image contains 512×1024 pixels, and each pixel actually has a pair of brightness values corresponding to VIS and NIR. Soil scientists receive hundreds of such image pairs and they are only interested in the tree part of the image. They try to first filter the trees from the background, then filter the trees into sunlit leaves, shadows and branches for statistical analysis. The present invention was applied to the (NIR,VIS) pairs for all pixels in an image (512×1024 2-d tuples).

Using 400 kbytes of memory (about 5% of dataset size) and 80 kbytes of disk space (about 20% of memory size), the data was filtered into 5 clusters corresponding to (1) very bright part of sky, (2) ordinary part of sky, (3) clouds, (4) sunlit leaves and (5) tree branches and shadows on the trees.

This step took 284 seconds. The branches and shadows were too similar to be distinguished from each other, although they could be separated together from the other cluster categories. The part of the data corresponding to tree branches and shadows (146707 2-d tuples) was thus pulled out and the present invention applied again, but with a much finer threshold, to obtain two clusters corresponding to branches and shadows.

Figure 25:
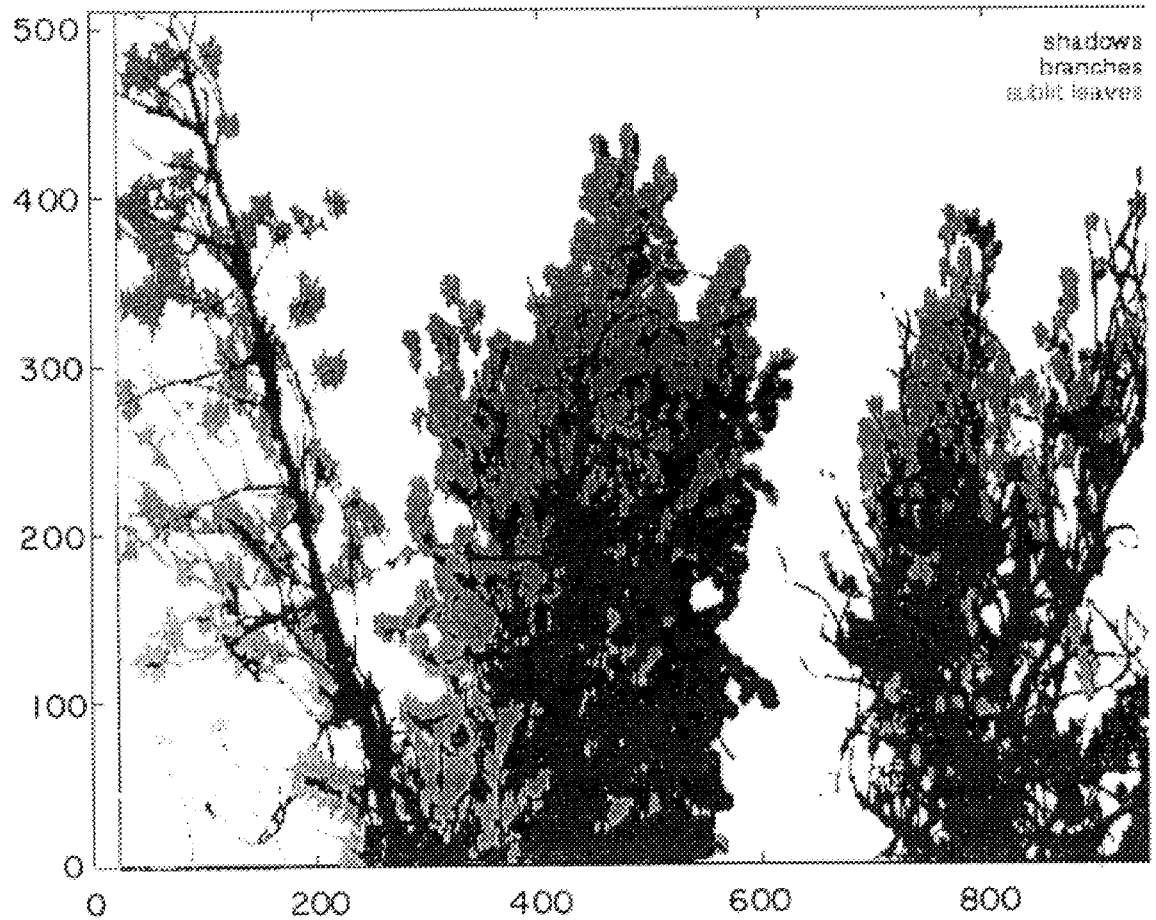
FIG. 25 is an image of parts of the scene of FIGS. 23 and 24 corresponding to tree branches, sunlit leaves, and shadows, as filtered by applying the present invention to correlate the images of FIGS. 23 and 24.

This step took 71 seconds. FIG. 25 shows the parts of images that correspond to sunlit leaves 100, tree branches 102 and shadows 104 on the trees that are obtained by using the present invention. Graphically, there is a very good correlation with the original images and the desired parts It is understood that the invention is not limited to the particular embodiment set forth herein as illustrative, but embraces such modified forms thereof as come within the scope of the following claims.

What is claimed is:

1. A method of clustering data, provided by a data source, in a computer processor having a main memory with a limited capacity, comprising the steps of:

(a) receiving data points from the data source;

(b) determining clusters of the data points that are within a selected threshold and determining a clustering feature for each such cluster, the clustering feature comprising the number of data points in the cluster, the linear sum of the data points in the cluster, and the square sum of the data points in the cluster, and storing the clustering feature for each cluster in the main memory; and (c) forming a clustering feature tree comprised of leaf nodes including leaf entries and at least one level of nodes joined to the leaf nodes, the leaf entries of the tree comprising the clustering features of the clusters, the next highest nodes in the tree above the leaves comprising nonleaf nodes that are each joined to a selected number of different leaves, the selected number comprising a branch number, each nonleaf node distinguished by identifiers stored in the main memory comprising the clustering features of each leaf to which the nonleaf node is joined and pointers indicating the leaves to which the node is joined, and further comprising, as necessary, higher level nodes joined to the branch number of lower level nodes, each higher level node distinguished by identifiers that are stored to main memory which comprise the clustering features for each lower node to which the higher node is joined and pointers indicating the lower nodes to which the higher node is joined, the tree terminating at a root node.

2. The method of claim 1 further comprising the steps of:

(1) receiving a new data point and assigning it to the clustering feature tree by, starting at the root node, assigning the data point to the lower level node that is closest to the data point in accordance with a selected distance measurement using the clustering feature for the lower level node, and continuing down through each of the levels in the tree by assigning the new data point to the closest lower level node by a selected distance measurement until the closest leaf is found in accordance with the selected distance measurement; and (2) testing the new data point to determine if the new data point is within the threshold to the closest leaf entry in accordance with a selected distance measurement and, if the new data point is within the threshold, revising the clustering feature for the closest leaf entry by adding to it the clustering feature values for the new data point and writing the revised clustering feature for the closest leaf entry to main memory, and if the new data point is not within the threshold, identifying the new data point as a new cluster and a new leaf entry, and if the leaf node containing the new leaf entry cannot accommodate the total number of leaf entries, splitting the leaf node to form two leaf nodes which comprise the leaf entries, and then updating all of the clustering feature identifiers for higher nodes which are on a path to the leaf node and if a split of a leaf node has occurred, splitting higher nodes if necessary to accommodate the split leaf node so that the branch number is not exceeded.

3. The method of claim 2 wherein each node in the clustering feature tree has a given page size in memory, and wherein, at the step of testing a new data point to determine if it is within the threshold, a new leaf cluster is created and one or more higher nodes above the leaves are split, with the split stopping at a higher node, then determining the two closest lower node entries in the node at which the splitting stops and if they are not the pair of lower node entries corresponding to the split, attempting to merge such closest lower nodes corresponding to the two lower node entries, comprising child nodes, and if there are more entries in the two child nodes than one page can hold, splitting the merging result again and if one of the child nodes has sufficient merged entries to fill a page, putting the rest of the entries with the other child node comprising a seed node.

4. The method of claim 2 wherein if a new data point is received which fills the main memory in the computer, increasing the selected threshold, and rebuilding a new and smaller clustering feature tree by reinserting the leaf entries of the old tree into the new tree using the new threshold.

5. The method of claim 4 wherein, when main memory becomes filled, a leaf entry in the tree which has a selected number fewer data points than an average leaf entry is designated as an outlier, and including the step of writing the clustering features for the outlier to an ancillary memory and removing it from the main memory.

6. The method of claim 5 wherein after data points available from the data source have been received and added to the clustering feature tree, when the threshold increases due to a new data point being read after an outlier is written to the disk, if the outlier entry may be absorbed into the new clustering, feature tree using the new threshold without causing the tree to grow in size, absorbing the outlier into the new clustering feature tree.

7. The method of claim 5 wherein the ancillary memory has a limited capacity, and if the capacity of the ancillary memory is filled before all data available from the data source have been received, examining the outliers in the ancillary memory to determine if any of them can be absorbed into the leaves in the current tree as a result of increases in the threshold, and if so, erasing such outliers from the ancillary memory and absorbing each such outlier into the closest leaf entry by adding its clustering feature to the clustering feature of that leaf entry.

8. The method of claim 5 wherein the ancillary memory is a magnetic disk memory.

9. The method of claim 2 wherein the selected threshold is a threshold value for a radius of a cluster, and wherein in the step of testing the new data point, a new radius of the leaf cluster is determined with the new data point included in the cluster and the resulting new radius is compared to the threshold value.

10. The method of claim 2 wherein the selected threshold is a threshold value for a diameter of a cluster, and wherein in the step of testing the new data point a new diameter of the leaf cluster is determined with the new data point included in the cluster and the resulting new diameter compared to the threshold value.

11. The method of claim 2 wherein, after all data points available from the data source have been received and processed, further comprising the steps of:

(1) given a desired number of leaf entries in the clustering feature tree, comparing the actual number of leaf entries in the clustering feature tree to the desired number and if the actual number exceeds the desired number, selecting a new threshold in accordance with a selected distance measurement which is expected to result in a clustering feature tree which has less than the desired number of leaf entries;

(2) freeing the non-leaf nodes of the clustering feature tree;

(3) using the new threshold distance, grouping leaf entries which are within the threshold of each other into single leaf entries and writing the clustering feature of such new leaf entries to main memory, and forming a new clustering feature tree with the new leaf entries so determined;

(4) comparing the number of leaf entries in the new clustering feature tree to the desired number of leaf entries and, if the number is equal to or less than the desired number, stopping the processing, and if the number is greater than the desired number of leaf entries, increasing the threshold to provide a revised threshold, and rebuilding a new and smaller clustering feature tree until the clustering feature tree has less than or equal to the desired number of leaves.

12. The method of claim 11 further comprising the steps of utilizing the clustering features of the leaf entires of the clustering feature tree as initial data objects and applying a selected clustering process to the leaf entry clustering features to provide a cluster result which has a selected number of clusters.

13. The method of claim 12 further comprising the steps of determining the centroids of the final clusters found after the process of claim 12, identifying such centroids as seed points, then reading all of the data points that have been utilized to form the clustering feature tree and determining the clusters of the data points that are closest to the seed points and determining a clustering feature for each such cluster.

14. The method of claim 2 further comprising the steps of utilizing the clustering features of the leaf entries of the clustering feature tree as initial data objects and applying a selected clustering process to the leaf entry clustering features to provide a cluster result which has a selected number of clusters.

15. A processing system for clustering data points provided by a data source, comprising:
   (a) a computer processor;
   (b) a main memory connected to the processor;
   (c) an ancillary memory connected to the processor;
   (d) means for receiving the data points from the data source for access by the processor;
   (e) means in the processor for analyzing the data points to determine clusters of the data points and to determine a clustering feature for each such cluster which comprises the number of data points in the cluster, the linear sum of the data points in the cluster, and the square sum of the data points in the cluster, and means for storing the clustering feature so determined for each cluster in the main memory.

16. The system of claim 15 including means in the processor for forming a clustering feature tree comprised of leaf nodes including leaf entries and at least one level of nodes joined to the leaf nodes, the leaf entries of the tree comprising the clustering features of the clusters, the next highest nodes in the tree above the leaves comprising nonleaf nodes that are each joined to a selected number of different leaves, the selected number comprising a branch number, means for storing in the main memory identifiers for each nonleaf node comprising the clustering features of each leaf to which the nonleaf node is joined and pointers indicating the leaves to which the node is joined, and means for forming, as necessary, higher level nodes joined to the branch number of lower level nodes, each higher level node distinguished by identifiers that are stored to main memory which comprise the clustering features for each lower node to which the higher node is joined and pointers indicating the lower nodes to which the higher node is joined, the tree terminating at a root node.

17. The system of claim 16 further comprising:
   (1) means in the processor for assigning a newly received data point to the clustering feature tree by, starting at the root node, assigning the data point to the lower level node that is closest to the data point in accordance with a selected distance measurement using the clustering feature for the node, and continuing down through each of the lower levels in the tree by assigning the new data point to the closest lower level node by a selected distance measurement until the closest leaf is found in accordance with the selected distance measurement; and
   (2) means in the processor for testing the new data point to determine if the new data point is within a selected threshold to the closest leaf entry in accordance with a selected distance measurement and, if the new data point is within the threshold, revising the clustering feature for the closest leaf entry by adding to it the clustering feature values for the new data point and writing the revised clustering feature for the closest leaf entry to the main memory, and if the new data point is not within the threshold, identifying the new data as a new cluster and a new leaf, and if the leaf node containing the new leaf entry cannot accommodate the total number of leaf entries, splitting the leaf node to form two leaf nodes which comprise the leaf entries, and then updating all of the cluster feature identifiers for higher nodes which are on a path to the leaf node and if a split of a leaf node has occurred, splitting higher nodes if necessary to accommodate the split leaf node so that the branch number is not exceeded.

18. The system of claim 17 wherein each node in the clustering feature tree has a given page size in memory, and wherein the means for testing a new data point to determine if it is within the threshold creates a new leaf cluster and splits one or more higher nodes above the leaves, with the split stopping at a higher node, and then determines the two closest lower node entries in the node at which the splitting stops and if they are not the pair of lower node entries corresponding to the split, attempts to merge such closest lower nodes, comprising child nodes, and if there are more entries in the two child nodes than one page can hold, then splits the merging result again and if one of the child nodes has sufficient merged entries to fill a page, then puts the rest of the entries with the other child node comprising a seed node.

19. The system of claim 17 including means for determining if a new data point is received which fills the main memory in the computer, and, if so, for increasing the selected threshold, and rebuilding a new and smaller clustering feature tree by reinserting the leaf entries of the old tree into the new tree using the new threshold distance.

20. The system of claim 19 wherein, when the main memory becomes filled, a leaf entry in the tree which has a selected number fewer data points than an average leaf cluster is designated as an outlier, and including means for writing the clustering features for the outlier to an ancillary memory and removing it from the main memory.

21. The system of claim 20 further including means for determining after data points available from the data source have been received and added to the clustering feature tree, when the threshold increases due to a new data point being read after an outlier is written to the disk, if the outlier may be absorbed into the new clustering feature tree using the new threshold without causing the tree to grow in size, absorbing the outlier into the clustering feature tree.

22. The system of claim 20 wherein the ancillary memory has a limited capacity, and including means for determining if the capacity of the ancillary memory is filled before all data available from the data source have been received and for then examining the outliers in the ancillary memory to determine if any of them can be absorbed into the leaves in the current tree as a result of increases in the threshold, and if so, erasing such outliers from the ancillary memory and absorbing each such outlier into the closest leaf entry by adding its clustering feature to the clustering feature of that leaf entry and storing the result in the main memory.

23. The system of claim 20 wherein the ancillary memory is a magnetic disk memory.

24. The system of claim 17 wherein the selected threshold is a threshold value for a radius of a cluster, and wherein in the means for testing the new data point, a new radius of the leaf cluster is determined with the new data point included in the cluster and the resulting new radius is compared to the threshold value.

25. The system of claim 17 wherein the selected threshold is a threshold value for a diameter of a cluster, and wherein in the step of testing the new data point a new diameter of the leaf cluster is determined with the new data point included in the cluster and the resulting new diameter compared to the threshold value.

26. A processing system for clustering data points provided by a data source comprising:

(a) a computer processor;

(b) a main memory connected to the processor, the main memory having a clustering feature tree stored therein comprised of leaf nodes including leaf entries and at least one level of nodes joined to the leaf nodes, the leaf entries of the tree comprising clustering features of the cluster, each clustering feature comprising the number of data points in the cluster, the linear sum of the data points in the cluster, and the square sum of the data points in the cluster, the next highest nodes in the tree above the leaves comprising nonleaf nodes that are each joined to a selected number of different leaves, the selected number comprising a branch number, each nonleaf node distinguished by identifiers stored in the main memory comprising the clustering features of each leaf to which the nonleaf node is joined and pointers indicating the leaves to which the node is joined, and further comprising, as necessary, higher level nodes joined to the branch number of lower level nodes, each higher level node distinguished by identifiers that are stored to main memory which comprise the clustering features for each lower node to which the higher node is joined and pointers indicating the lower nodes to which the higher node is joined, the tree terminating at a root node;

(c) an ancillary memory connected to the processor;

(d) means for receiving the data points from the data source for access by the processor;

(e) means in the processor for receiving a new data point and assigning it to the clustering feature tree by, starting at the root node, assigning the data point to the lower level node that is closest to the data point in accordance with a selected distance measurement using the clustering feature for the lower level node, and continuing down through each of the levels in the tree by assigning the new data point to the closest lower level node by a selected distance measurement until the closest leaf is found in accordance with the selected distance measurement; and (f) means for testing the new data point to determine if the new data point is within a selected threshold distance to the closest leaf entry in accordance with the selected distance measurement and if so, revising the clustering feature for the closest leaf entry by adding to it the clustering feature values for the new data point and writing the revised clustering feature for the closest leaf entry to main memory, and if the new data point is not within the threshold, identifying the new data as a cluster and a new leaf entry, and if the leaf node containing the new leaf entry cannot accommodate the total number of leaf entries, splitting the leaf node to form two leaf nodes which are comprised of leaf entries, and then updating all of the clustering feature identifiers for higher nodes which are on a path to the leaf node and if a split of a leaf node has occurred, splitting higher nodes if necessary to accommodate the split leaf node so that the branch number is not exceeded.

27. The system of claim 26 wherein each node in the clustering feature tree has a given page size in memory, and wherein the means for testing a new data point to determine if it is within the threshold creates a new leaf cluster and splits one or more higher nodes above the leaves, with the split stopping at a higher node, and then determines the two closest lower node entries in the node at which the splitting stops and, if they are not the pair of lower node entries corresponding to the split, attempts to merge such closest lower node entries, comprising child nodes, and if there are more entries in the two child nodes than one page can hold, then splits the merging result again and if one of the child nodes has sufficient merged entries to fill a page, puts the rest of the entries with the other child node comprising a seed node.

28. The system of claim 26 including means for determining if a new data point is received which fills the main memory in the computer, and, if so, for increasing the selected threshold, and rebuilding a new and smaller clustering feature tree by reinserting the leaf entries of the old tree into the new tree using the new threshold.

29. The system of claim 26 wherein, when the main memory becomes filled, a leaf entry in the old tree which has a selected number of fewer data points than an average leaf entry is designated as an outlier, and including means for writing the clustering features for the outlier to the ancillary memory and removing it from the main memory.

30. The system of claim 29 further including means for determining after data points available from the data source have been received and added to the clustering feature tree, when the threshold increases due to a new data point being read after an outlier is written to the ancillary memory, if the outlier entry may be absorbed into the new clustering feature tree using the new threshold, absorbing the outlier into the clustering feature tree.

31. The system of claim 29 wherein the ancillary memory has a limited capacity, and including means for determining if the capacity of the ancillary memory is filled before all data available from the data source have been received and for then examining the outliers in the ancillary memory to determine if any of them can be absorbed into the leaves in the current tree as a result of increases in the threshold, and if so, erasing such outliers from the ancillary memory and absorbing each such outlier into the closest leaf entry by adding its clustering feature to the clustering feature of that leaf entry and storing the result in the main memory.

32. The system of claim 29 wherein the ancillary memory is a magnetic disk memory.

33. The system of claim 27 wherein the selected threshold is a threshold value for a radius of a cluster, and wherein in the means for testing the new data point, a new radius of the leaf cluster is determined with the new data point included in the cluster and the resulting new radius is compared to the threshold value.

34. The system of claim 27 wherein the selected threshold is a threshold value for a diameter of a cluster, and wherein in the step of testing the new data point a new diameter of the leaf cluster is determined with the new data point included in the cluster and the resulting new diameter compared to the threshold value.

\* \* \* \* \*